US012175976B2

United States Patent
Henry et al.

(10) Patent No.: US 12,175,976 B2
(45) Date of Patent: Dec. 24, 2024

(54) MULTI-ASSISTANT DEVICE CONTROL

(71) Applicant: Amazon Technologies, Inc., Seattle, WA (US)

(72) Inventors: David Henry, New York, NY (US); John Ryan Sherritt, Seattle, WA (US); Philippe Andre Lantin, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 17/944,600

(22) Filed: Sep. 14, 2022

(65) Prior Publication Data
US 2024/0096316 A1  Mar. 21, 2024

Related U.S. Application Data

(60) Provisional application No. 63/400,636, filed on Aug. 24, 2022.

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
CPC ... G10L 15/22; G10L 15/08; G10L 2015/223; G06F 3/167
See application file for complete search history.

(56) References Cited

U.S. PATENT DOCUMENTS

| 8,995,625 | B2 | 3/2015 | Vance et al. |
| 9,996,316 | B2 | 6/2018 | Jorgovanovic |
| 10,482,904 | B1 | 11/2019 | Hardie et al. |
| 10,546,583 | B2 | 1/2020 | White et al. |
| 10,685,669 | B1 | 6/2020 | Lan et al. |
| 10,909,983 | B1 | 2/2021 | Peng et al. |
| 11,393,477 | B2 | 7/2022 | Mahmood et al. |
| 11,538,478 | B2 | 12/2022 | Bobbili et al. |
| 11,790,902 | B2 | 10/2023 | Whalin et al. |
| 11,922,938 | B1 * | 3/2024 | Khan ............... G10L 15/32 |

(Continued)

OTHER PUBLICATIONS

International Search Report and Written Opinion mailed on Nov. 8, 2023 for International Patent Application No. PCT/US2023/030415, 13 pages.

(Continued)

*Primary Examiner* — Yogeshkumar Patel
(74) *Attorney, Agent, or Firm* — Pierce Atwood LLP

(57) ABSTRACT

A speech-processing system may provide access to one or more virtual assistants via an audio-controlled device. A multi-agent component of a device may be used to coordinate control of device process(es) regardless of the invoked agent and without necessarily sharing information between agents and corresponding speech-processing system(s). Device-state information may be sent from the multi-agent component to a speech-processing system to interpret a user command. If the command relates to a device process control it may be routed to a device skill and to the multi-agent component of the device. The multi-agent component may track a device state and may inform a particular speech-processing system if a process related to the particular speech-processing system has been controlled.

20 Claims, 14 Drawing Sheets

(56) References Cited

U.S. PATENT DOCUMENTS

| | | | |
|---|---|---|---|
| 12,001,260 B1* | 6/2024 | Chemudugunta | G10L 15/22 |
| 2020/0380984 A1 | 12/2020 | Venkatraman et al. | |
| 2021/0183397 A1* | 6/2021 | Liu | G06F 3/011 |
| 2022/0180867 A1* | 6/2022 | Bobbili | G10L 15/22 |

OTHER PUBLICATIONS

U.S. Office Action issued Aug. 28, 2024 for U.S. Appl. No. 17/944,566.

* cited by examiner

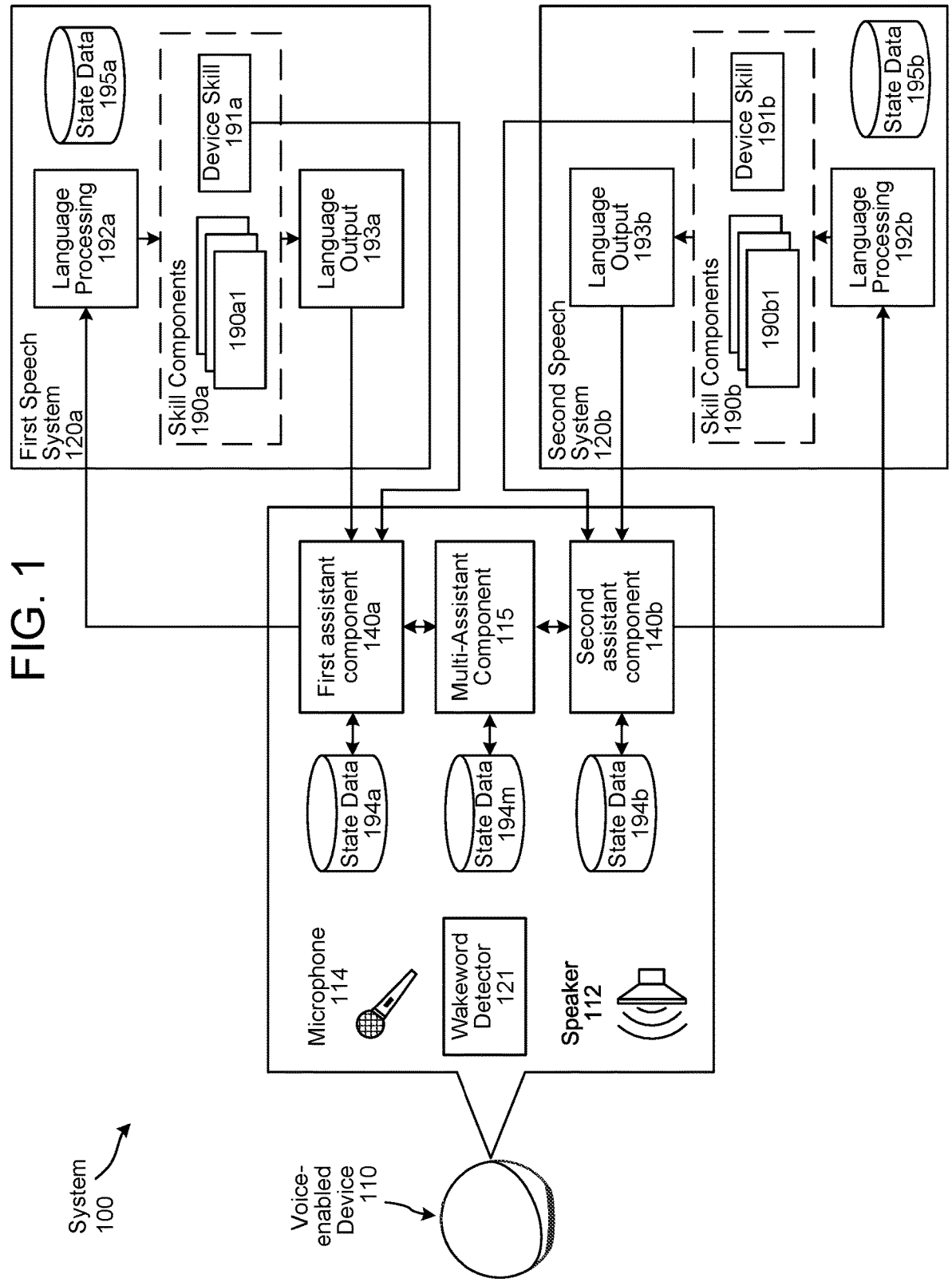

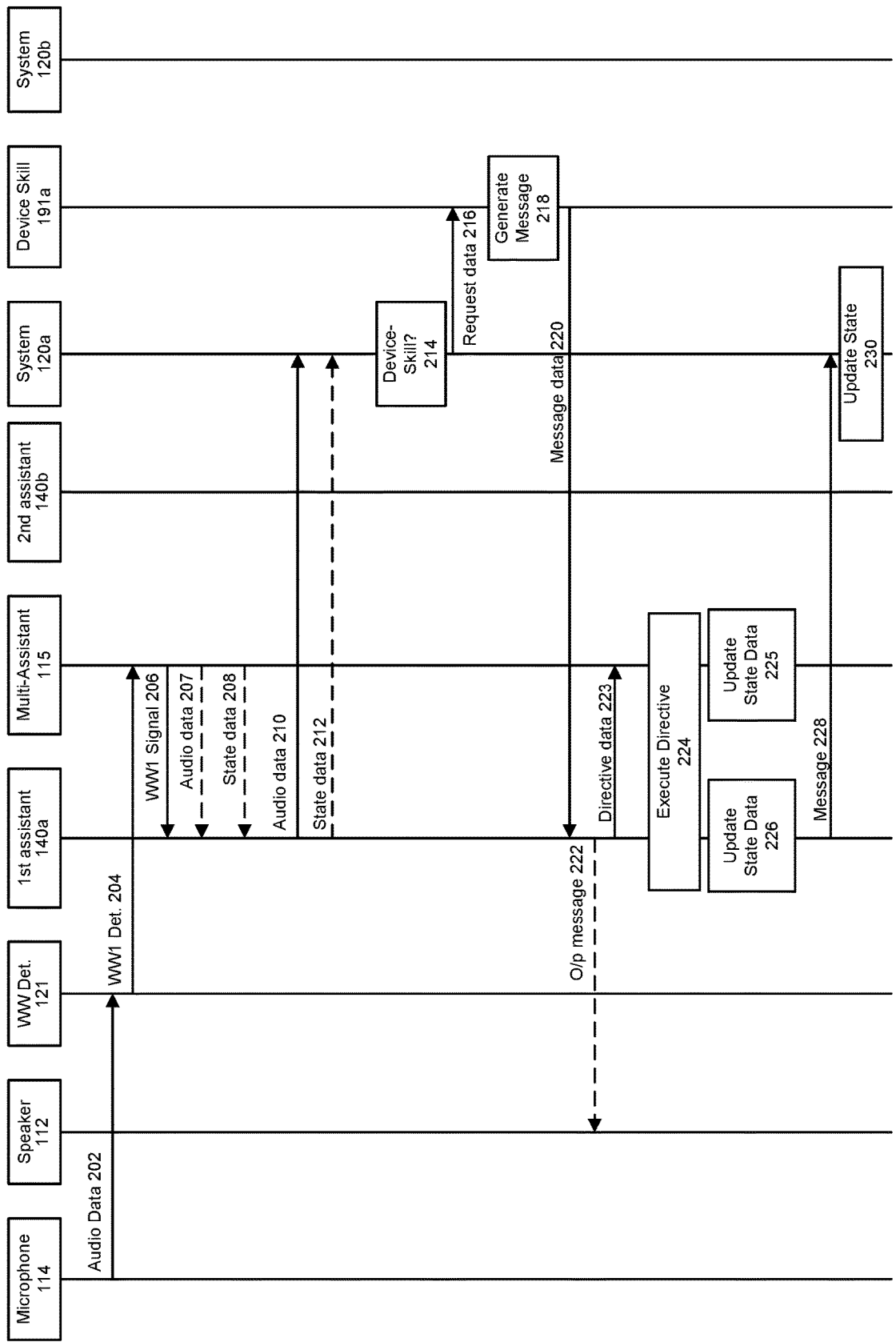

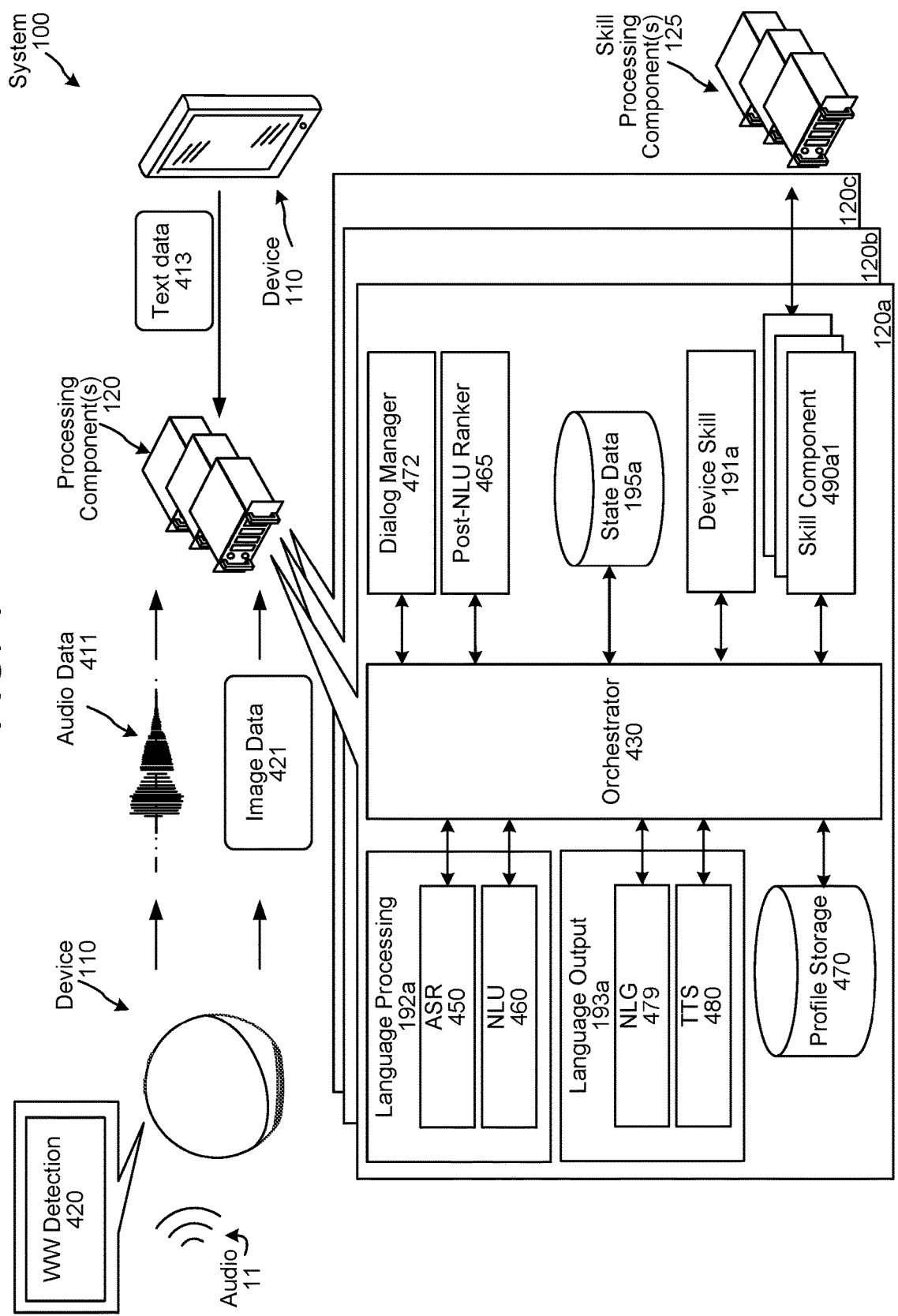

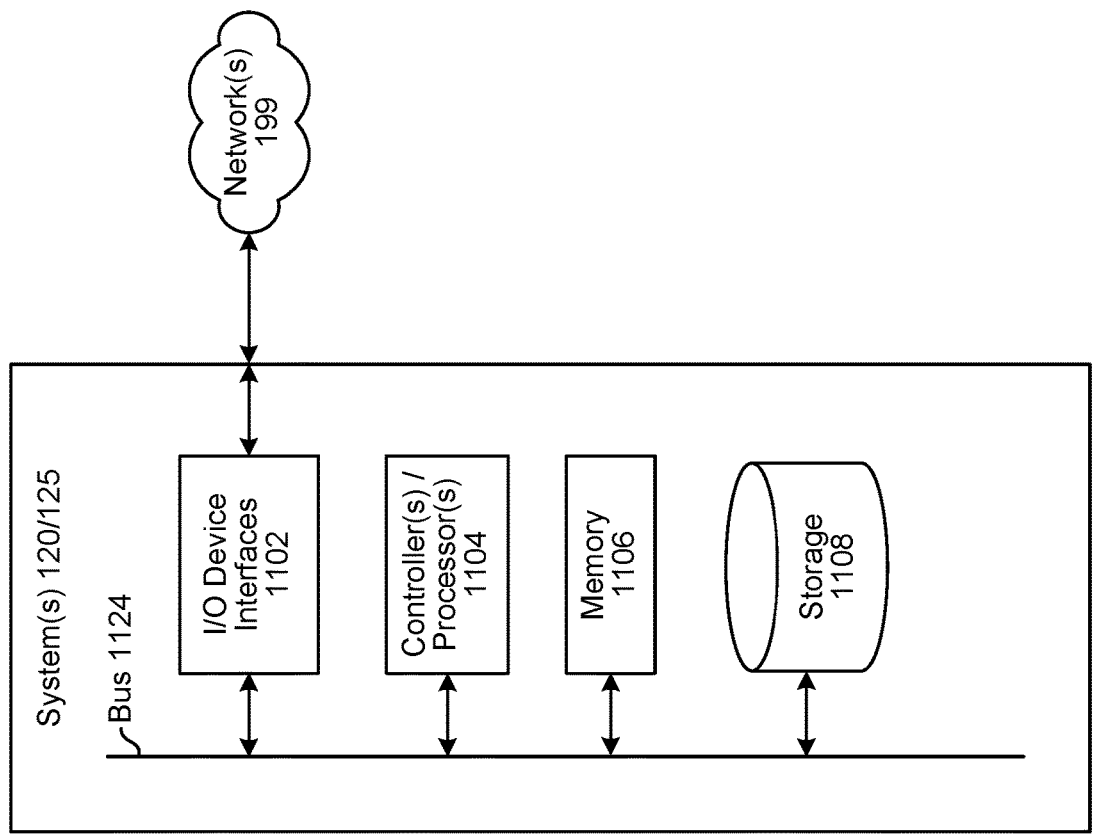

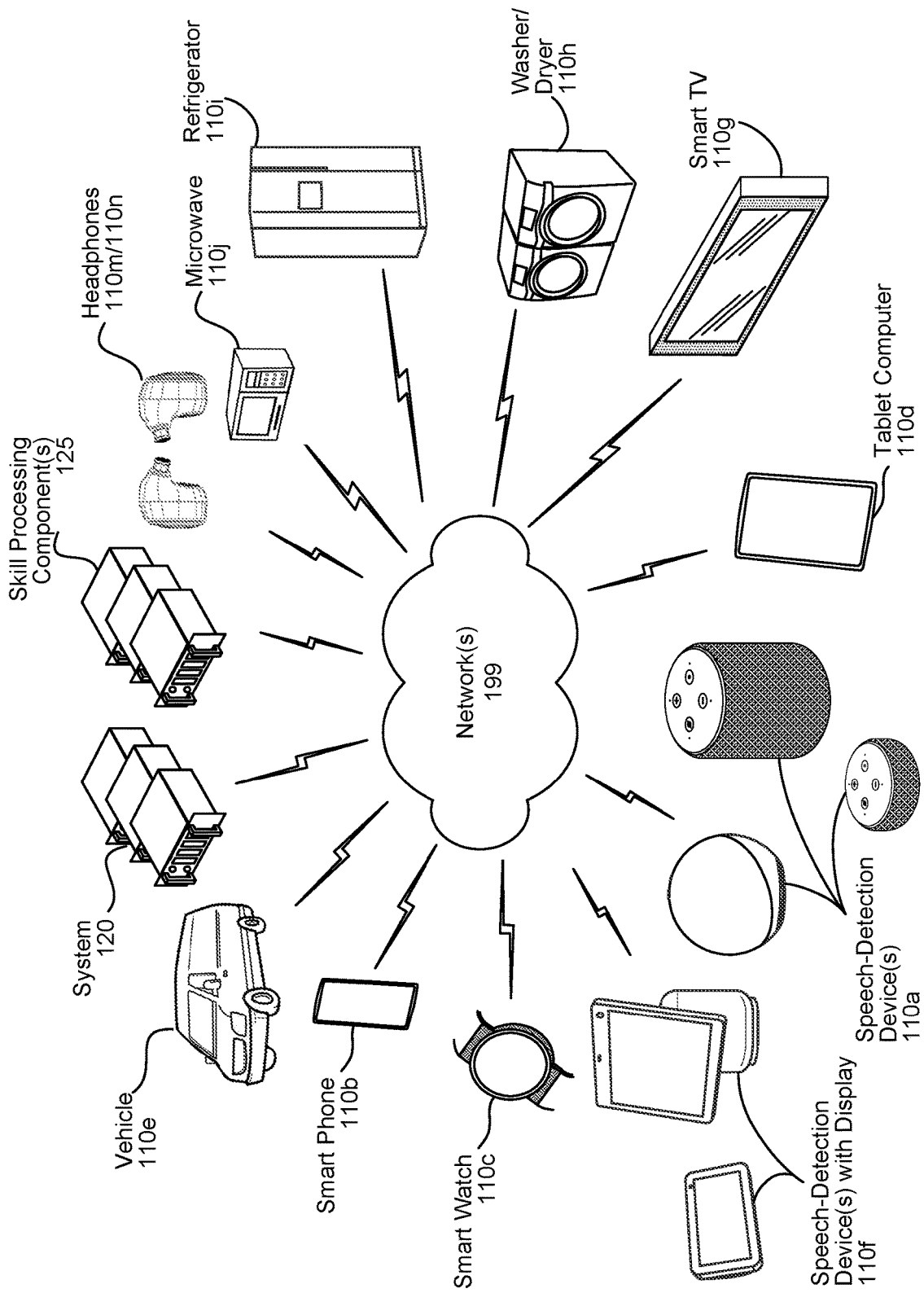

MULTI-ASSISTANT DEVICE CONTROL

CROSS-REFERENCE TO RELATED APPLICATION

This application claims priority to U.S. Provisional Patent Application No. 63/400,636, filed Aug. 24, 2022 and titled "MULTI-ASSISTANT DEVICE CONTROL," the content of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating components of a virtual assistant system with features for protected cross-assistant command processing, according to embodiments of the present disclosure;

FIGS. 2A-2B are signal flow diagrams illustrating example operations for protected cross-assistant command processing, according to embodiments of the present disclosure;

FIG. 4 is a conceptual diagram of components of a speech processing system, according to embodiments of the present disclosure;

FIG. 11 is a block diagram conceptually illustrating example components of a system, according to embodiments of the present disclosure; and FIG. 12 illustrates an example of a computer network for use with the overall system, according to embodiments of the present disclosure.

DETAILED DESCRIPTION

Figure 2B:
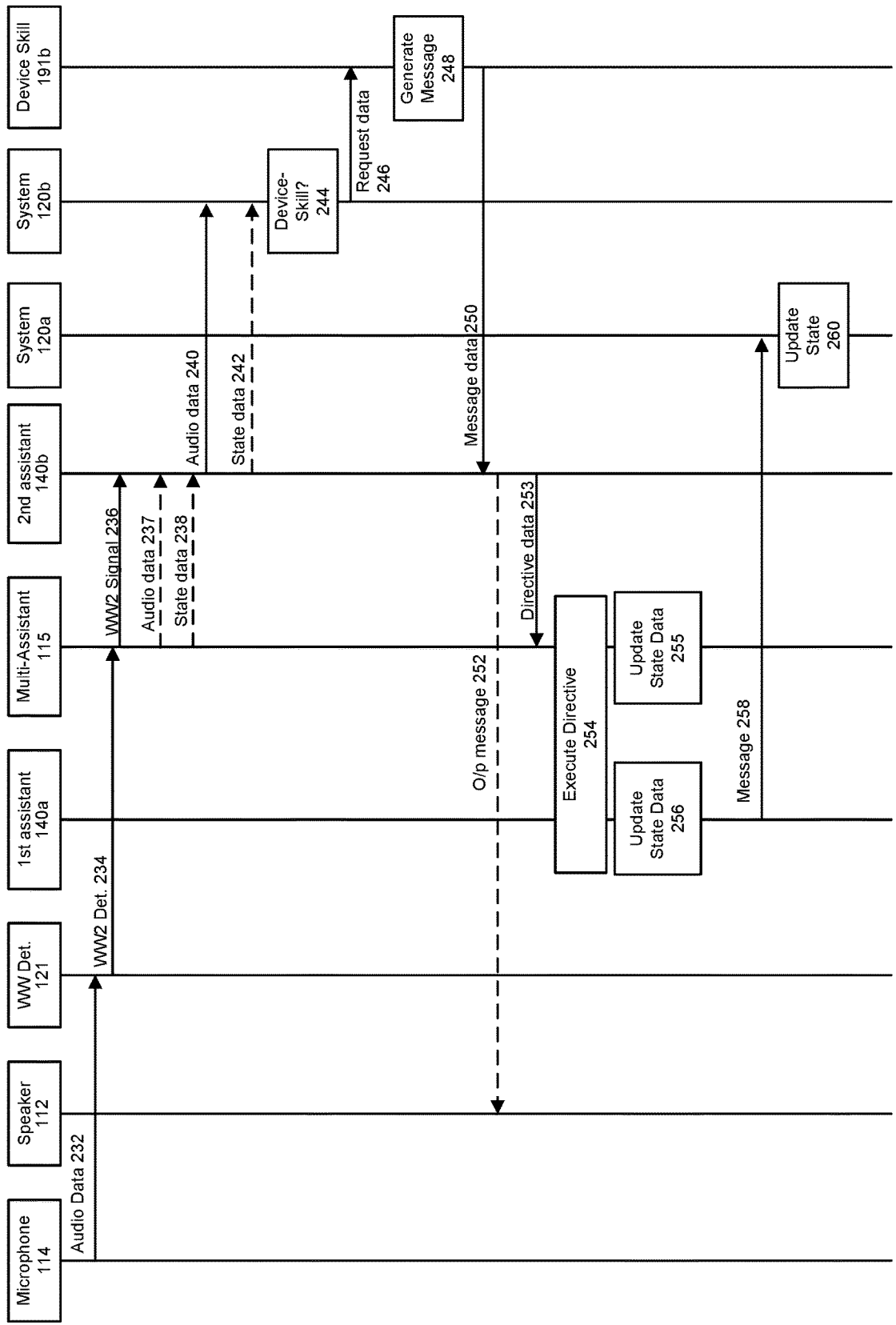

Speech processing systems and speech generation systems can be combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other type of word representative data of that speech. Similarly, natural language understanding (NLU) is a field of computer science, artificial intelligence, and linguistics concerned with enabling computers to derive meaning from text or other natural language meaning representation data. ASR and NLU may be used together as part of a speech processing system, sometimes referred to as a spoken language understanding (SLU) system. Text-to-speech (TTS) is a field of computer science concerning transforming textual and/or other meaning representation data into audio data that is synthesized to resemble human speech. ASR, NLU, and TTS may be used together to act as a virtual assistant that can respond to spoken commands and respond with synthesized speech. For example, an audio-controlled user device and/or one or more speech-processing systems may be configured to receive human speech and detect a wakeword used to activate the device and/or other natural language input. The device and/or system may determine a command represented by the user input, and use TTS and/or other system command to provide a response (e.g., in the form of synthesized speech, command to send audio to a different device/system component, etc.).

Some audio-controlled devices can provide access to more than one speech-processing system, where each speech-processing system may provide services associated with a different virtual assistant. In such multi-assistant systems, one or more of the speech-processing systems may be associated with its own set of wakewords, which for invoking the speech-processing system, as well as associated with other observable characteristics such as voice characteristics and other audible or visual indicators that allow a user to identify which speech-processing system the user is interacting with.

Under certain circumstances an overall system may be configured in a manner that does not allow certain communications/operations between speech-processing systems. This may be for a number of reasons. First, a user may have one set of permissions with a first speech-processing system that does not allow sharing of certain data to a second speech-processing system. Further, centralized user settings may not permit sharing of user utterance information to a speech-processing system that was not directly invoked by the user. Thus, to increase the perceived protection of user privacy, communication between different speech-processing system components may be prevented. Second, while a first speech-processing system and a second speech-processing system may each be invoked from a first device, the systems themselves may not desire to share information directly between them. This may true be in a situation where the first speech-processing system and second speech-processing system have different speech processing architectures/pipelines (as opposed to sharing many speech processing components) such that commands invoking the first speech-processing system go to one set of device(s)/component(s) for processing while commands invoking the second speech-processing system go to a different set of device(s)/component(s) for processing. This may be true in the situation where a first speech-processing system and second speech-processing system are managed by competing entities. Thus it may not be permitted to share information directly between different speech-processing system components. Thus, in certain overall system configurations components of a first speech-processing system may not be configured to communicate with components of a second speech-processing system.

In certain circumstances, however, a user may speak a command using the wakeword of one system when the command actually relates to a different system. For example, a user may start a timer using a wakeword of a first assistant/system (for example, "Alexa, set a timer for 10 minutes") but, when the timer has ended and a device is beeping, the user may try to stop the timer using the wakeword of a second assistant/system (for example, "Kitchen, cancel the timer"). If a first speech-processing system (such as one associated with the wakeword "Alexa") is separate from a second speech-processing system (such as one associated with the wakeword "Kitchen"), the user's command to stop the timer may not be understood by the second speech-processing system as it would not necessarily process the command "cancel the timer" correctly as it would have no information about any timer in progress since the initial command to set the timer was processed by the first speech-processing system. In such a circumstance the second speech-processing system may return an error to the user (for example, output audio of "I'm sorry, there are no timers set") which may cause user frustration, particularly if the user may not recall which wakeword the user spoke when starting the timer and thus may be unsure how to stop the beeping.

In another example, a first user may start a process (e.g., a timer, playing media, turning on a camera feed, etc.) using a first assistant/system but a second user may attempt to control the process (e.g., by stopping the process, skipping a song, etc.) using a second assistant/system. Such a situation may occur with a shared device where the first user interacts with the shared device using the first assistant while the second user interacts with the shared device using the second assistant. If the first user starts a process with the device and leaves the room, the second user may experience difficulty controlling the ongoing process using the second assistant. This may occur because, similar to the example above with a timer, the second assistant may not have information regarding the process which may result in output of an error and an undesired user experience.

Offered are techniques and components to improve the ability to process commands across speech-processing systems, particularly when those speech-processing systems may have limits that govern what information may be exchanged directly between them. A device may include a multi-assistant component that can pass information and commands and/or arbitrate the use of device resources between components that are dedicated to a particular speech-processing system. Individual speech-processing system(s) may also have information indicating which commands relate to device control (for example which commands should be handled by a device-control skill) so that commands related to device control may be processed by one system even if they may relate to device controls of another system. Although the disclosure below illustrates operations with regard to two speech-processing systems, the teachings herein are applicable to configurations with more than two speech-processing systems.

Speech-processing systems may be configured to determine when a user input requests control of a device process. In such circumstances, the system will send data for the request to a special device skill that can communicate with a dedicated component on the device that can manage device process commands, communicate with multiple speech-processing systems, and arbitrate between them. The device skill will send the command to the dedicated component on the device, thus enabling control of a device process by one speech-processing system, even if the device process may have been initiated by a different speech-processing system.

A device process may involve controlling a process that involves some action to be performed by a device. Such a device process control may include, for example, starting/stopping a timer, setting/stopping an alarm, playing/stopping media content (such as a song, video, podcast, etc.), controlling output content (such as skipping a song, going back a song, extending/snoozing a timer/alarm, stopping synthesized speech output, etc.), setting a temperature (for example if a device may operate as a thermostat), activating/deactivating a component of the device (such as a camera, light, etc.), controlling a device setting (such as volume, brightness, sensitivity, etc.), setting/controlling a reminder, initiating/controlling/terminating a call or call request, or the like. A device process control may thus control a device to transition from a first state (e.g., outputting audio, showing something on a display) to a second state (e.g., ceasing output of audio, outputting audio at a different volume, showing something else on the display, removing something from the display, etc.).

Although the respective systems are referred to herein as "speech-processing systems" they may also be considered natural language processing systems in that they may be configured to process natural language inputs that may not necessarily be spoken and may be input using some other method such as text inputs to an application (or the like) where the application may correspond to a particular assistant/system. Thus, inputs and outputs from the device need not be in (or represent) spoken language. In some implementations, the user may be able to input natural language inputs via text, braille, American Sign Language (ASL), etc., depending on system configuration. Other inputs to trigger a processing system are also possible, such as an acoustic event (e.g., baby crying, footsteps), a button press, etc.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating components of a virtual assistant system 100 with features for protected cross-assistant command processing, according to embodiments of the present disclosure. The virtual assistant system 100 may include an audio-enabled device 110, a first natural language/speech-processing system 120a (which may be abbreviated "first system 120a"), and a second natural language/speech-processing system 120b (which may be abbreviated "second system 120b"). The first system 120a and the second system 120b may be referred to collectively as "systems 120." Although FIG. 1 illustrates the first system 120a and the second system 120b as having similar components in a similar arrangement, the components, functions, and/or architectures of the first system 120a and the second system 120b may differ. In addition, some or all of the components and/or functions of one or both of the first system 120a and/or the second system 120b may reside on, or be performed by, the device 110. Other possible arrangements of the components and functions of the device 110 and the systems 120 are described in additional detail below with reference to FIGS. 4 and 5. As noted above, while two systems 120 are shown for sake of illustration, any number and variety of systems 120 can be supported and be coordinated consistent with the principles and processes described herein.

The device 110 may receive audio corresponding to a spoken natural language input originating from a user (not illustrated). The device 110 may process audio following detection of a wakeword. A wakeword may be a word or phrase that, when detected, may cause a device 110 to invoke a speech-processing system 120 for processing audio data that accompanies or includes the wakeword. The wakeword may be specific to a particular speech-processing system 120. Thus if a device 110 detects a first wakeword it may route data corresponding to the speech to a first speech-processing system while if the device 110 detects a second wakeword it may route data corresponding to the speech to a second speech-processing system. (The device 110 may also be configured to detect any number of wakewords having any correlation with the set of available speech-processing systems 120 such that no wakeword is associated with more than one speech-processing system 120.) The device 110 may generate audio data corresponding to the audio/speech, and may send the audio data to the first system 120a and/or the second system 120b. The device 110 may send the audio data to the systems 120 via one or more applications installed on the device 110. An example of such an application is the Amazon Alexa application that may be installed on a smart phone, tablet, or the like. In some implementations, the device 110 may receive text data corresponding to a natural language input originating from the user 5, and send the text data to one of the systems 120. The device 110 may receive output data from the system 120, and generate a synthesized speech output and/or perform some action. The device 110 may include a camera for capturing image and/or video data for processing by the systems 120. Examples of various devices 110 are further illustrated in FIG. 12.

The systems 120 may include supporting components of local and/or remote system(s) such as a group of computing components located geographically remote from device 110 but accessible via network 199 (for example, servers accessible via the internet). The systems 120 may also include a remote system that is physically separate from device 110 but located geographically close to device 110 and accessible via network 199 (for example a home server located in a same residence as device 110). The systems 120 may also include some combination thereof, for example where certain components/operations are performed via on device components or a home server(s) and others are performed via a geographically remote server(s). Although the figures and discussion of the present disclosure illustrate certain steps in a particular order, the steps described may be performed in a different order (as well as certain steps removed or added) without departing from the present disclosure.

The device 110 may include a microphone 114 for receiving audio and a speaker 112 for emitting audio. The device 110 may include one or more wakeword detectors 121 capable of detecting one or more wakewords. In some implementations, a wakeword detector 121 may be embedded in a processor chip; for example, a digital signal processor (DSP). In some implementations, a wakeword detector 121 may be an application-driven software component. In certain instances a single wakeword detector 121 may be capable of detecting multiple wakewords for more than one system. In other instances a device 110 may include multiple wakeword detectors, such as a first wakeword detector 121a and a second wakeword detector 121b, each capable of detecting its own wakeword. For example, a first wakeword detector 121a may detect one or more wakewords associated with the first system 120a, and a second wakeword detector 121b may detect one or more wakewords associated with the second system 120b.

The device may include one or more assistant components 140 including the first assistant component 140a and the second assistant component 140b. The assistant component(s) 140 may interface with one or more of the systems 120. In the example system 100 shown in FIG. 1, the first assistant component 140a communicates with the first system 120a, and the second assistant component 140b communicates with the second system 120b. In some implementations, a single assistant component 140 may handle communications with more than one system 120. The device 110 may have a dedicated assistant component 140 for a system 120, or a single assistant component 140 communicating with all systems 120. The device may include a multi-assistant component 115 for managing multi-assistant and cross-assistant operations of the device 110 as described herein. The device may also include a set of components to store/track state data 194. (As noted below, state data 194 can be separately tracked and maintained by each assistant component 140 as well as by the multi-assistant component 115.) Such state data 194 may indicate the state of the device 110 (and/or a user profile corresponding to the device 110) and may correspond to one or more processes of the device. Examples of state data may include volume level, data indicating what is being shown on a display, time data, network access data, timer status, or the like. The state data 194 may be stored on the device 110 or potentially on another device such as a remote device, home server, or the like. Additional components of the device 110 are described in additional detail below with reference to FIG. 10.

In certain configurations, to maintain privacy perception and/or other separation between speech-processing systems, a first assistant component 140a may not be configured to communicate with a second assistant component 140b without routing the communication through the multi-assistant component 115. In this way the multi-assistant component 115 may mediate the interactions between the speech-processing system components. Similarly, the multi-assistant component 115 (or other remote/cloud component) may mediate communications between the first system 120a and the second system 120b. Thus speech-processing systems may not be configured to directly communicate, particularly when such communications may involve a particular utterance being processed. While illustrated to operate physically on device 110, the multi-assistant component 115 may operate on a different physical device, for example a home server or the like. In such (or other) situations the multi-assistant component 115 may coordinate multi-assistant operations for multiple devices 110, where such devices 110 may be associated with one or more user accounts. For example, a single multi-assistant component 115 may coordinate multi-assistant operations for multiple device(s) associated with a particular user/user profile, family/family profile/multiple user profile(s), or the like.

As part of such separation, in certain configurations, each speech-processing system and/or components associated therewith, may store/manage their own state data 194 with respect to the device. For example, a first assistant component 140a associated with first system 120a may store/manage state data 194a which includes data regarding interactions/operations with regard to the device 110 (and/or a user profile associated with device 110) and first system 120a. For example, if a user interacts with device 110 to invoke first system 120a (for example by speaking a first wakeword associated with first system 120a), the first assistant component 140a may save certain information regarding the interaction between device 110 and first system 120a as state data 194a. Thus, if a device process is initiated as a result of a command to first system 120a, the first assistant component 140a may store information regarding that device process as state data 194a. For example, if a user starts a timer by invoking a first assistant associated with first system 120a, the state data 194a may reflect the start time of the timer, time remaining, label associated with the timer, etc. In another example, if a user starts to play music by invoking a first assistant associated with first system 120a, the state data 194a may reflect the start of the music, the source of the music content (e.g., music service), information about currently playing music, information about previously played music, etc.

A second assistant component 140b may also store/manage its own state data 194b with respect to interactions/operations with regard to the device 110 (and/or a user profile associated with device 110) and second system 120b. Such management of state data 194b with regard to second system 120b may operate similarly to that described above with regard to 194a and first system 120a. As part of the separation of systems, however, first assistant component 140a may not have access to state data 194b and second assistant component 140b may not have access to state data 194a. Thus each system/assistant component may only track state data 194 with respect to its own operations.

Certain state data 194 may also be stored/managed by multi-assistant component 115. Such state data is shown in FIG. 1 as 194m. This state data 194m may include information related to device processes ongoing at the device and may include some portion(s) of information stored in 194a/194b and/or other information about management of device processes. For example, if a timer is ongoing, state data 194m may include an indicator that the timer is ongoing and the system 120 that was used to invoke the timer, but may not include as many details of the timer as the state data 194 of the invoking system. Similarly, if music is being output, state data 194m may indicate that music is being played but may not include all the details of the music playback. State data 194m may indicate which device process(es) are active at any particular point in time (for example, timer ongoing, timer ended and beeping, music playback ongoing, etc.) State data 194m may indicate which device controls are executable for a particular device process (whether ongoing or not). For example, state data 194m may indicate if a device 110 is capable of stopping, extending, pausing a timer; stopping, pausing, adjusting volume for music playback, etc. State data 194m may also indicate which channels (e.g., hardware components) are currently being used by what process(es), etc. Information may be exchanged between multi-assistant component 115 and a single assistant component 140 to update the respective state data(s) and/or execute controls for the device 110/a device process. For example, an application programming interface (API) or other interface, registration process, etc. may be used to coordinate between the multi-assistant component 115 and a single assistant component 140 to exchange information about a state/process of the device 110.

The systems 120 may include various components for processing natural language commands. A system 120 may include a language processing component 192 for performing operations related to understanding natural language such as ASR, NLU, entity resolution, etc. The system 120 may include a language output component 193 for performing operations related to generating a natural language output, such as TTS. The system 120 may also include a component to track system state data 195. Such system state data 195 may indicate the state of operations of the respective system 120 for example with respect to a particular device 110, user profile, or the like. For example, state data 195 may include dialog data, indications of previous utterance(s), whether the system 120 has any ongoing processes for the device 110/user profile, or the like. The system 120 may include one or more skill components 190. The skill components 190 may perform various operations related to executing commands such as online shopping, streaming media, controlling smart-home appliances, and the like.

One of the skills available to the system 120 may include a device skill 191. Such a device skill may be configured to handle and manage specific utterances that involve controlling a device process or a device state. Each system 120 may have its own device skill 191 and/or a central device skill 191 may be accessible to multiple systems 120. Each device skill 191 may be associated with its own skill processing components 125 (discussed below).

A device skill 191 may be configured to communicate with the device 110 through the assistant component(s) 140. Thus the device skill 191 may send commands to control the device 110 (in coordination with the multi-assistant component 115) through the assistant component(s) 140. Thus a system 120 may send a command/message/directive to the multi-assistant component 115 by routing such communication(s) through individual assistant components 140. For example, a device control command from first system 120a may be sent from device skill 191a to the first assistant component 140a which then routes the device control command to the multi-assistant component 115.

FIGS. 2A-B are signal flow diagrams illustrating example operations for protected cross-assistant command processing, according to embodiments of the present disclosure. FIG. 2A illustrates operations in which a user can instruct a first system 120a to initiate a device process. FIG. 2B illustrates operations in which a user can instruct a second system 120b to control the same device process that was initiated in FIG. 2A using the first system 120a using components such as 115, 191, etc. rather than by allowing communications directly between the first system 120a and the second system 120b. Specifically, FIG. 2A illustrates operations between a microphone 114, a speaker 112, a wakeword detector 121, a first assistant component 140a, a multi-assistant component 115, and a second assistant component 140*b* of a device 110, and the first system 120*a*, device skill 191*a* (which may be of the first system 120*a*), and the second system 120*b*.

As shown in FIG. 2A, the microphone 114 may receive an audio signal and send (202) audio data to the wakeword detector 121. The audio data may represent, for example, a natural language command such as: "Alexa, set a timer for 10 minutes." The wakeword detector 121 may detect the wakeword "Alexa," corresponding with the first speech-processing system 120*a* and the first assistant component 140*a*. The wakeword detector 121 may notify (204) the multi-assistant component 115 that the first wakeword was detected in the input.

In some implementations, the device 110 may receive input data in other formats, such as typed or scanned text, braille, or American Sign Language (ASL) (for example as detected by processing image data and/or sensor data representing a user communicating in ASL). The device 110 may determine that the input data is to be processed by the first system 120*a* based on other indications, such as a button press or because the first system 120*a* represents a default system 120 for executing commands from the device 110.

The multi-assistant component 115 may signal (206) the first assistant component 140*a* that the first assistant component 140*a* may send data representing the command (e.g., the audio data) to the first system 120*a*. After the multi-assistant component 115 confirms invocation of the first system 120*a* (e.g., through detection of the first wakeword by the wakeword detector 121), the audio data of the utterance may be sent to the first assistant component 140*a*. The audio data may be sent (207) to the first assistant component 140*a* by the multi-assistant component 115 or by another component. The multi-assistant component 115 may also send (208) the first assistant component 140*a* state data 194 corresponding to the state of the device 110 and/or the user profile corresponding to the device 110. The state data being sent (208) may be data available to the multi-assistant component 115 (e.g., taken from state data 194*m*). Such state data may indicate one or more process controls capable of being executed by device 110. In certain instances, such state data being sent may only apply to active process(es) of the device 110. Thus the state data sent may comprises metadata corresponding to process(es) and/or process controls of the device 110. The first assistant component 140*a* may send (210) audio data representing the command to the first system 120*a*. The first assistant component 140*a* may also send (212) the state data to the first system 120*a*. The state data sent (212) from the first assistant component 140*a* to the first system 120*a* may include all or some of the state data (e.g., portion of state data 194*m*) sent from the multi-assistant component 115 to the first assistant component 140*a* above in step 208. The state data sent (212) from the first assistant component 140*a* to the first system 120*a* may also include certain state data (e.g., state data 194*a*) available to the first assistant component 140*a* that may be distinct from the state data 194*m*. The state data may indicate one or more active hardware component(s) of the device 110, which may indicate activity on certain processing channel(s) of the device. The system may use a particular identifier, such as an utterance identifier to track data related to the utterance across the different components. For example, as audio data of an utterance is received the device 110 may assign a particular identifier to the audio data. That identifier may be sent along with the WW detection indication (204), the WW signal (206), state data (208/212), audio data (210), etc. so that the device 110, system 120*a*, etc. can keep track of information related to the particular utterance.

The device/profile state data 194 (either corresponding to one of the assistant component(s) 140 and/or the multi-assistant component 115) ultimately sent to a speech-processing system 120 may be obtained from storage on the device 110 or from storage on a different device corresponding to a same user profile. The state data 194 (in particular the state data 194*m*) may indicate what processes are ongoing and/or controllable using the device 110 (and/or other device associated with a user profile associated with the state data 194). For example, if the device 110 has ongoing dialog and timer the state data 194*m* may indicate <dialog>; <timer>. The state data 194*m* may also indicate what commands may be performed (which may relate to a device process). For example, the state data 194*m* may indicate <stopdialog>; <stoptimer>; <adjusttimer> or the like. The state data 194*m* may indicate a number of different controllable device process(es) or may only indicate active device process(es). The state data 194*m* may also indicate a type of the command. For example, certain commands may relate to dialog control, alert control, content control, etc. Such types may be indicated in the state data 194*m*. The state data 194*m* may also indicate priority information relative to particular device process(es). For example, if a device is playing music while also outputting a beeping corresponding to a timer that has expired, the state data 194*m* may indicate the timer has a higher priority than the music playback. Depending on system configuration, user permissions/privacy settings, or the like, the state data sent (208/212) may be limited in some manner, for example only indicating ongoing device process(es), to reduce the amount of state data shared.

The first system 120*a* may perform speech processing (for example using language processing components 192*a* and corresponding operations described herein) to determine if the input user request corresponds to a request to control a device process and thus should be routed (214) to a device skill. Such a determination may involve processing both the audio data and other data indicating which potential commands/requests may relate to control of a device process. That other data may include the state data (e.g., state data 194) that corresponds to a device/user profile. The state data 194 may indicate what commands correspond to a device process, thus allowing the first system 120*a* to properly determine when an incoming request corresponds to a device process, thus indicating whether processing for that request should be handled by a device skill. Such a device skill may be configured to send commands to the multi-assistant component 115 (using routing discussed herein) for purposes of indicating to the device one or more directive(s) to control device process(es). Such directives allow the multi-assistant component 115 to coordinate control of the device with assistant component(s) 140 and other components. Although FIGS. 2A (and 2B) illustrate the device/profile state data 194 being sent from the multi-assistant component 115, the first system 120*a* may also obtain device/profile state data 194 from another source, for example an off-device storage component that is in communication with the first system 120*a* may provide access to the state data, which may be similar to state data 194*m* (or other state data 194). Such a determination may also involve processing of other data indicating the process capabilities of the device 110 and/or other device(s) corresponding to the user profile.

If the incoming request does correspond to a device skill (e.g., the request corresponds to a control of a device process) as determined by the language processing (for example using other data/state data 194), the first system 120*a* may route (216) data related to the request to the device skill 191*a* of the first system. Such data may include NLU results data (such as NLU output data 885/ranked output data 825 as discussed below) and/or may include processed data that is based on such NLU results data but has been converted into a particular command specific for the device process.

In the example of the utterance of "Alexa, set a timer for 10 minutes," the first system 120*a* may use state data 194 to determine that a device 110 is capable of operating a timer and may determine that the command corresponds to a request to control a device process and may determine that the device skill should be invoked. Thus the first system 120*a* may send to the device skill 191*a* data representing the request, for example an instruction to start a timer, or the like. The device skill 191*a* may then generate (218) output data to be included in a message to the device. The device skill 191*a* may send (220) the message data back to the device 110. Such a message may be routed through the first assistant component 140*a*. The message data may include a directive to control a device process, the example of FIG. 2A that may be a directive to start a timer. The first assistant component 140*a* may receive the message data and may determine that it includes a directive corresponding to a device process control. The message data may also (or in the alternative) include information indicating that the message corresponds to a process to be managed by the multi-assistant component 115. The first assistant component 140*a* may process the message data to determine (based on the directive and/or routing instructions) that the request should be handled by the multi-assistant component 115. The first assistant component 140*a* may then route the message/directive data (or a portion thereof) (223) to the multi-assistant component 115. Thus, as the message data may be coming from a component (the device skill 191*a*) associated with the first system 120*a* it may be first routed through the first assistant component 140*a* before being sent to the multi-assistant component 115.

The message/output data may include the utterance identifier that links the particular output data to the input data (e.g., the audio data 202). In this manner, the first system 120*a* may indicate to the device 110 that the particular message/output data goes with a particular input that the device 110 received. The message/output data may include a directive/command to the device 110 to begin a 10 minute timer. The directive may also include an indication as to the assistant/system that the user invoked during the request (e.g., "Alexa") so that the appropriate system may keep track of the timer for management purposes. Thus, in the example of FIG. 2A, the message data may include an indication of the first system 120*a*.

The message data may also include data to be output as an acknowledgement of the command, such as synthesized speech acknowledging the command, data to be shown on a display of the device 110 acknowledging the command, or the like. If such acknowledgement is included, it may be output by the device, for example by sending (222) output audio of the acknowledgement message from the first assistant component 140*a* (or other component) to the speaker 112 for output as synthesized speech (e.g., "starting your timer now").

The first assistant component 140*a* and/or multi-assistant component 115 may then execute (224) the directive that was received from the device skill 191*a*. In the above example, this may include executing the request to start a timer. The multi-assistant component 115 may receive the directive/message data and process it to determine the requested control is one executable by the device 110. The multi-assistant component 115 may also determine that the process to be controlled relates to first assistant component 140*a*. For example, the request may also indicate the assistant that the user originally invoked for the timer. Alternatively (or in addition) the request may indicate the identifier for the original utterance. That identifier may be used by the multi-assistant component 115 to identify the wakeword that accompanied the original utterance, thus allowing the multi-assistant component 115 to determine the originally invoked assistant. The multi-assistant component 115 may then instruct the first assistant component 140*a* (and/or other component(s)) to take actions necessary to start the timer (or otherwise execute the directive to control the device process). The first assistant component 140*a* may then take actions to execute the directive (e.g., start the timer) and may indicate to the multi-assistant component 115 that the timer has started. For example the first assistant component 140*a* may register with the multi-assistant component 115 information about the timer control, for example what controls are available with respect to the timer, and/or other timer data.

The multi-assistant component 115 may then update its device/user profile state data 194*m* to note data related to the timer. For example, the multi-assistant component 115 may update (225) state data 194*m* to indicate that a timer is active and that the device 110 may be configured to respond to commands controlling/stopping the particular active timer. The first assistant component 140*a* may also update (226) its own state data 194*a* to indicate information about the timer and may send (228) a message to the first system 120*a* regarding starting of the requested timer. The first system 120*a* may then take any actions needed related to the starting of the timer and may update (230) its own state data locally and remotely (e.g., system state data 195*a*) to indicate the requested timer (e.g., length of timer, timer start time, timer end time, associated device and/or user profile), etc.

In this manner, as reflected in FIG. 2A, a user may invoke a first assistant to initiate a command that controls a device process (e.g., the setting of a 10 minute timer). The invoked first system 120*a* may process the request, determine it relates to controlling a process of the device 110, and route information about that request through the multi-assistant component 115, which in turn may manage the process with the first system 120*a*.

As can be seen in FIG. 2B, that device process may also be controlled using a second invoked assistant that is different from the original invoked assistant, even if the respective systems for those assistants are not in direct communication or aware of the other assistant being accessible via the device 110. The multi-assistant component 115 may allow such operations as described herein.

Continuing the example illustrated in FIG. 2A, after 10 minutes the timer may expire and the device 110 may be outputting audio corresponding to the end of the timer such as a beeping, or the like. In the example of FIG. 2B a user (which may or may not be the same user that initiated the timer) may speak a command to end the timer, only accompanied by a different wakeword (for a different assistant/system) than the original request to start the timer. For example, the command to terminate the timer may be "Kitchen, turn off the timer" where "Kitchen" is a second wakeword associated with a second assistant/second system 120*b* that is different from the first assistant/first system 120*a*.

As shown in FIG. 2B, the microphone 114 detects the audio of the utterance and sends (232) audio data to the wakeword detector 121. The wakeword detector 121 may detect the wakeword "Kitchen," corresponding with the second speech-processing system 120b and the second assistant component 140b. The wakeword detector 121 may notify (234) the multi-assistant component 115 that the second wakeword was detected in the input.

The multi-assistant component 115 may signal (236) the second assistant component 140b that the second assistant component 140b may send data representing the command to the second system 120b. After the multi-assistant component 115 confirms invocation of the second system 120b (e.g., through detection of the second wakeword by the wakeword detector 121), the audio data of the utterance may be sent to the second assistant component 140b. The audio data may be sent (237) to the second assistant component 140b by the multi-assistant component 115 or by another component. The multi-assistant component 115 may also send (238) the second assistant component 140b state data 194 corresponding to the state of the device 110, including processes and state data shared by other assistants, and/or the user profile corresponding to the device 110. The state data being sent (238) may be data available to the multi-assistant component 115 (e.g., taken from state data 194m). Such state data may indicate one or more process controls capable of being executed by device 110. In certain instances, such state data being sent may only apply to active process(es) of the device 110. Thus the state data sent may comprises metadata corresponding to process(es) and/or process controls of the device 110. In the example of FIG. 2B, the state data being sent may indicate the active timer and one or more controls executable by the device 110 with respect to the timer (e.g., stop timer, pause timer, etc.) The second assistant component 140b may send (240) audio data representing the command to the second system 120b. The second assistant component 140b may also send (242) the state data to the second system 120b. The state data sent (242) from the second assistant component 140b to the second system 120b may include all or some of the state data (e.g., portion of state data 194m) sent from the multi-assistant component 115 to the second assistant component 140b above in step 238. The state data sent (242) from the second assistant component 140b to the second system 120b may also include certain state data (e.g., state data 194b) available to the second assistant component 140b that may be distinct from the state data 194m. The state data may indicate one or more active hardware component(s) of the device 110, which may indicate activity on certain processing channel(s) of the device. As with the first utterance of FIG. 2A, the system may use a particular identifier, such as an utterance identifier to track data related to the second utterance across the different components. That second identifier may be sent along with the WW detection indication (234), the WW signal (236), state data (238/242), audio data (240), etc. so that the device 110, system 120b, etc. can keep track of information related to the second utterance.

The state data 194 sent (238) to the second assistant component 140b and/or sent (242) to the second system 120b may indicate available timer controls, that the originally requested timer has expired and is causing output of corresponding audio (e.g., the beeping), or similar state information. In some implementations, the state data that is shared by the multi-assistant component 115 can be selected to be as minimal as necessary for each assistant to be aware of the shared state data from other assistants, such as a listing of shared controls, processes, focus channels, and the like. As noted above with regard to the example of FIG. 2A, in the example of FIG. 2B, the second system 120b may obtain state data from the device 110 (e.g., through the second assistant component 140b) and/or from another source of state data 194.

The second system 120b may perform speech processing (for example using language processing components 192b and corresponding operations described herein) to determine if the input user request corresponds to a request to control a device process and thus should be routed (244) to a device skill. Such a determination may involve processing both the audio data and other data indicating which potential commands/requests may relate to control of a device process. That other data may include the state data (e.g., state data 194) that corresponds to a device/user profile including that state data that was shared by other assistants via the multi-assistant component. Such a determination may also involve processing of other data indicating the process capabilities of the device 110 and/or other device(s) corresponding to the user profile.

In the example of FIG. 2B, the second system 120b/language processing determines the incoming request does correspond to a device skill (e.g., the request corresponds to a control of a device process, e.g., ending the timer) and so the second system 120b may route (246) data related to the request to the device skill 191b of the second system 120b. Such data may include NLU results data (such as NLU output data 885/ranked output data 825 as discussed below) and/or may include processed data that is based on such NLU results data but has been converted into a particular command specific for the device process.

In the example of the utterance of "Kitchen, turn off the timer," second system 120b may use state data 194 to determine that a device 110 can process a <stoptimer> command and thus second system 120b may determine that the command corresponds to a request to control a device process. Note that in this particular example, the second system 120b may not have information that indicates a timer is even active with regard to the first system 120a or which assistant controls that timer. Instead, the second system 120b may have interpreted the command to end a timer, determined that such a command relates to a device process, and thus routed processing of the command to the device skill 191b (and ultimately to the multi-assistant component 115), even if the second system 120b may not have had information about the original timer. In some implementations, the device skill 191b selected is specific to processes managed or arbitrated by the multi-assistant component 115.

The second system 120b may thus invoke the device skill. The second system 120b may send (246) to the device skill 191b data representing the request, for example an instruction to send a timer, or the like. The device skill 191b may then generate (248) output data to be included in a message to the device. The device skill 191b may send (250) the message data back to the device 110. Such a message may be routed through the second assistant component 140b. The message data may include a directive to control a device process, in this example a directive to stop the timer. The second assistant component 140b may receive the message data and may determine that it includes a directive corresponding to a device process control (e.g., stopping a timer). The message data may also (or in the alternative) include information indicating that the message corresponds to a process to be managed by the multi-assistant component 115. The second assistant component 140b may process the message data to determine (based on the directive and/or routing instructions) that the request should be handled by the multi-assistant component 115. The second assistant component 140b may then route the message/directive data (or a portion thereof) (253) to the multi-assistant component 115. Thus, as the message data may be coming from a component (the device skill 191*b*) associated with the second system 120*b* it may be first routed through the second assistant component 140*b* before being sent to the multi-assistant component 115.

The message/output data may include the utterance identifier that links the particular output data to the input data (e.g., the audio data 232). In this manner, the second system 120*b* may indicate to the device 110 that the particular message/output data goes with a particular input that the device 110 received. In this example, the message/output data may include a directive/command to the device 110 to stop a timer.

The message data may also include data to be output as an acknowledgement of the command, such as synthesized speech acknowledging the command, data to be shown on a display of the device 110 acknowledging the command, or the like. If such acknowledgement is included, it may be output by the device, for example by sending (252) output audio of the acknowledgement message from the second assistant component 140*b* to the speaker 112 for output as synthesized speech (e.g., "stopping the timer"). The output acknowledgement message to the user may also be visual, such as a display element indicating the timer is being cancelled.

The multi-assistant component 115 may then take actions to execute the directive that was received from the device skill 191*b*. In the above example, this may include executing the request to terminate a timer. As the request to stop the timer came from the second system 120*b*, the message data 250 may not indicate which timer is to be stopped. The multi-assistant component 115 may take further actions to determine which timer is to be stopped.

Specifically, the multi-assistant component 115 may receive the message data/directive and determine the directive relates to controlling a specific device process, namely controlling the timer. The multi-assistant component 115 may evaluate its state data 194*m* to determine timer information. Such information may be available in the state data 194*m* as a result of the first assistant component 140*a* registering the timer information with the multi-assistant component 115 (for example in relation to the operations of FIG. 2A). By evaluating the state data 194*m* the multi-assistant component 115 may determine that a timer is associated with the device 110 (and/or user profile of the device) is active, timer controls for the device, assistant corresponding to the timer (e.g., the first assistant component 140*a*), etc. Thus, by referring to the state data 194*m*, the multi-assistant component 115 may determine that the command to end the timer corresponds to a timer that was originally initiated using the first system 120*a*. The multi-assistant component 115 may then coordinate with the first assistant component 140*a* to execute (254) the directive to end the timer. Specifically, the multi-assistant component 115 may send the first assistant component 140*a* an instruction to end the timer. The first assistant component 140*a* may then take steps to end the timer as it normally would (for example if a user pressed a button to end the timer, the command to end the timer came from the first system 120*a*, etc.). The first assistant component 140*a* may also update (256) its own state data 194*a* to indicate information about the stopped timer and may send (258) a message to the first system 120*a* to advise that the requested timer has been stopped. The first system 120*a* may then update (260) its own state data (e.g., system state data 195*a*) to indicate the requested timer has stopped. The multi-assistant component 115 may also update (255) the device/user profile state data 194*m* to note the timer has stopped.

The multi-assistant component 115 may thus coordinate with other components of the device 110 to stop the timer, which may include ceasing output of the audio (e.g., beeping) associated with the timer.

The techniques illustrated above with regard to FIGS. 2A and 2B may also be implemented for many other device processes, with such cross-assistant device controls being coordinated by the multi-assistant component 115 and the device skill(s) 191. These configurations and techniques allow commands intended for processing using one assistant to be successfully processed by the overall system, even when the command invokes the incorrect assistant, without sharing information directly between assistants/speech processing systems.

Using an example along the lines of those discussed above, if a user initiates a process using a first speech-processing system 120*a* (such as described above using FIG. 2A) but then speaks a command of "stop" while invoking a second speech-processing system 120*b*, the device/profile state data 194 used to process the command of "stop" may indicate what processes are active/what "stop"-type commands are available for the particular device/user profile. Thus the second speech-processing system 120*b* may use the device/profile state data 194 to interpret the command as relating to one of the available stop commands, route the processing through a device skill 191*b* and eventually back to the multi-assistant component 115, so the multi-assistant component 115 can coordinate with the first assistant 140*a* to ultimately stop the active process that was initiated using the first speech-processing system 120*a*.

In certain configurations, the device that captures the audio of the utterance may be different than the actual device to be controlled. For example, a user may speak an utterance to a smart watch 110*c* (shown in FIG. 12) along the lines of "Alexa, stop the music." The utterance may refer to music playing not on the smart watch 110*c*, but on another device, for example, on a home audio system. The speech-processing system that receives the audio data of the utterance (for example, first system 120*a* associated with the wakeword "Alexa") may, as described herein, determine the utterance corresponds to a device control (for example, using language processing components 192*a*) and may send data corresponding to the utterance to the device skill 191*a*. The first system 120*a* may also determine that the utterance originated from a device/user associated with a particular user profile. The first system 120*a* may send an indication of that user profile to the device skill 191*a*. Alternatively (or in addition) the device skill 191*a* may determine that the utterance originated from a particular device (e.g., smart watch 110*c*) or user associated with a specific user profile. The first system 120*a* and/or device skill 191*a* may determine that the user profile is also associated with an audio output device 110*a* that is capable of playing music, is playing music, and/or is generally capable of performing music control operation(s) (for example as indicated by state data 194 of the user profile) regardless of whether such music playback was initiated as a result of a command to first system 120*a* or to a different system such as second system 120*b*. The device skill 191*a* may then determine output data, including a command to stop music playback, and may send that output data to the audio output device 110*a* through that device's multi-assistant component 115, for example using a process as illustrated above in FIG. 2B. The device skill 191*a* may also send other output data to the smart watch 110c to acknowledge receipt and/or handling of the request to stop the music playback.

Figure 3A:
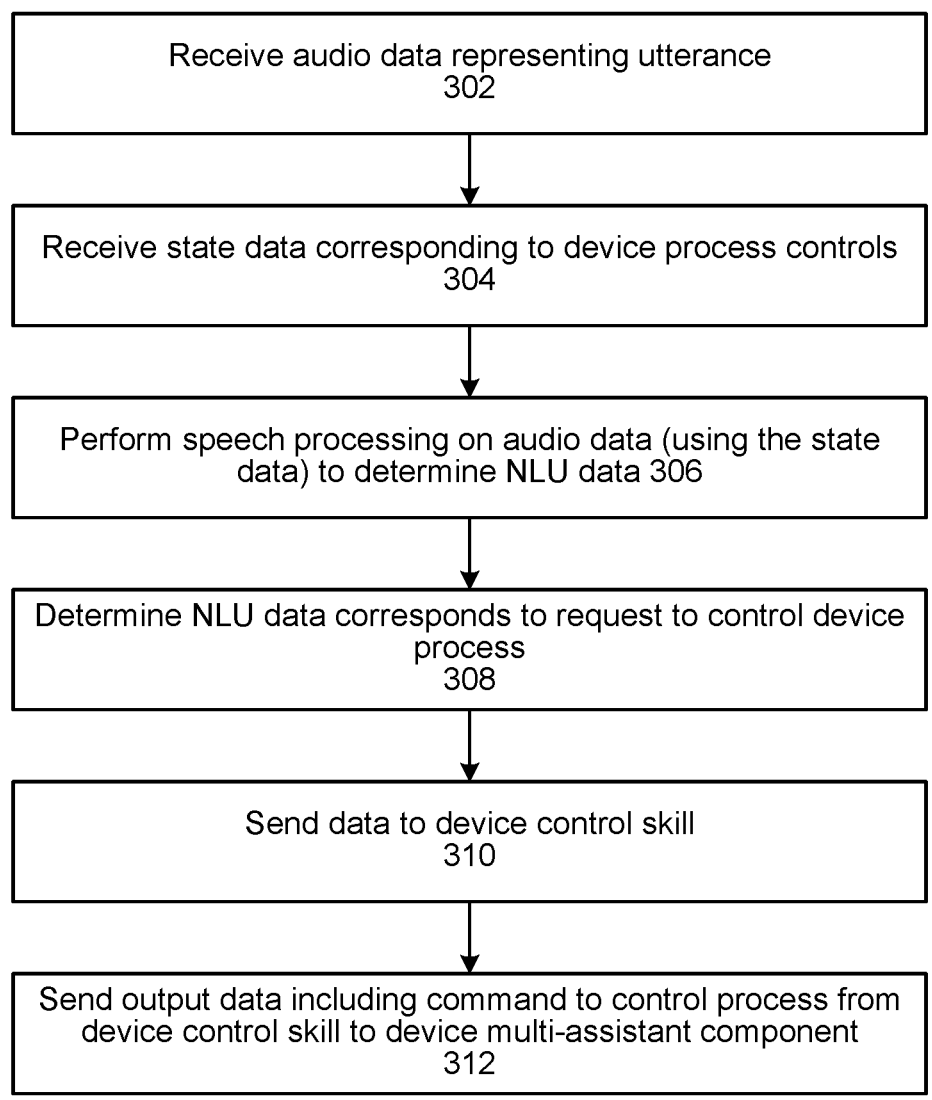
FIGS. 3A-3B are flowcharts illustrating example operations for performing cross-assistant command processing, according to embodiments of the present disclosure.

FIG. 3A shows a flowchart illustrating example operations of a system for performing cross-assistant command processing. As shown, a system 120 may receive (302) audio data representing an utterance from a device 110 capable of interacting with multiple different assistants/speech-processing systems. The system 120 may receive (304) state data corresponding to device process controls capable of being performed either by the device 110 or by another device referred to in the utterance (e.g., another device associated with a same user profile as device 110). Such state data (e.g., device/profile state data 194) may be received from the device 110 or from some other data source (e.g., profile storage 470 discussed below, device skill 191a, and/or other source). The system 120 may then perform (306) speech processing on the audio data to determine NLU results data. Such speech processing may use the state data 194 received above. The system may also use the state data 194 to determine (308) that the NLU results data corresponds to a request to control a device process. As a result, the system may send (310) data representing the request to a device control skill 191. The data may include the NLU results data or some other version of data indicating the device process to be controlled, the control to be executed, the device to be controlled, a user profile or other identifier corresponding to the request, and/or other information related to the request. The device skill 191 and/or other component may then send (312) output data to the device 110 (e.g., to the multi-assistant component 115). The output data may include a command to control the process and/or other data, such as acknowledgement data discussed above. Execution of the related command/directive may be coordinated between multi-assistant component 115 and an assistant component 140. Other details of these operations are discussed herein.

Figure 3B:
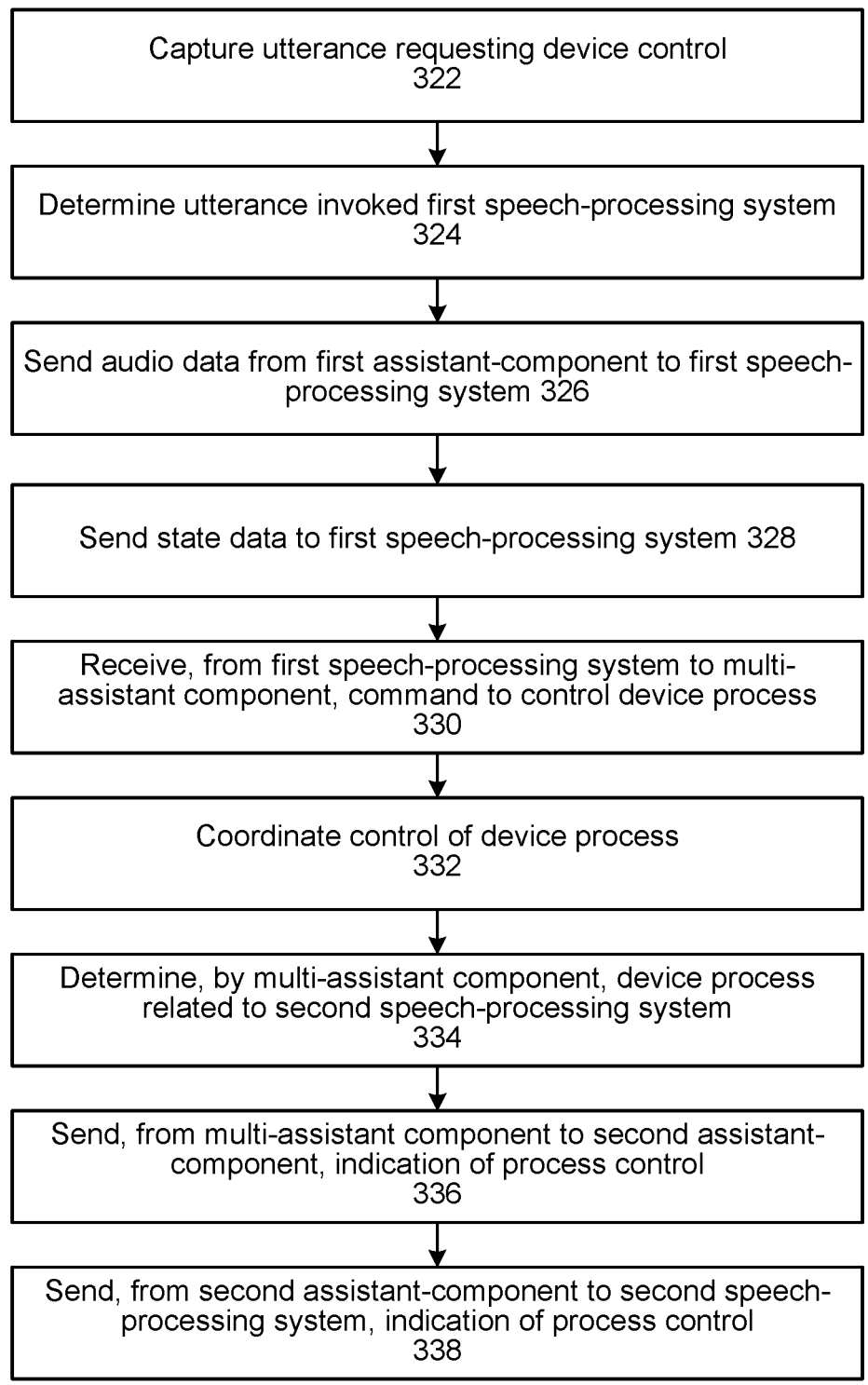

FIG. 3B shows a flowchart illustrating example operations of a device for performing cross-assistant command processing. As shown, a device 110 may capture (322) an utterance requesting control of a device process. The device 110 may determine (324) that the utterance corresponds to an invocation of a first speech-processing system. Such invocation may be the result of detection of a particular wakeword of the first system 120a, a press of a button corresponding to the first system 120a, detection of a gesture associated with the first system 120a, interaction with a device corresponding to first system 120a, or the like. The device 110 may then send (326) audio data representing the utterance from a first assistant component 140a to the first system 120a. The device 110 may also send (328) state data 194 to the first system 120a. Such state data 194 may be sent by the multi-assistant component 115 (which may use the first assistant component 140a as an intermediary). The state data 194 may indicate a capability of the device 110 but may not indicate the system that was originally invoked to initiate the process to be controlled. The device 110 may then receive (330) from the first system 120a (e.g., from a device skill 191a) to a multi-assistant component 115, a command to control the device process. The multi-assistant component 115 may receive the command and cause the device or an associated assistant component 140 to coordinate (332) control of the requested device process (e.g., adjusting a volume, stopping music playback, controlling a timer, etc.). As noted above, the multi-assistant component 115 may coordinate with an assistant component(s) 140 to execute device control/a specific directive. The multi-assistant component 115 may determine (334) that the device process related to a second system 120b. For example, the multi-assistant component 115 may evaluate state data 194m, or other data, indicating the source of the original command. The multi-assistant component 115 may then send (336) an indication of the process control to the second assistant component 140b which may then send (338) the indication to the second system 120b, thus allowing the second system 120b to update its own state data 195b to track the control (e.g., the termination, adjustment, etc.) of the process that was originally initiated as a result of a command involving second system 120b.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 420. The wakeword detection component 420 may be configured to detect various wakewords. In at least some examples, a wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 1018 of the device 110 and may send image data 421 representing those image(s) to the system 120. The image data 421 may include raw image data or image data processed by the device 110 before sending to the system 120.

The wakeword detector 420 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 420 and/or input is detected by an input detector, the device 110 may "wake" and begin transmitting audio data 411, representing the audio 11, to the system(s) 120. The audio data 411 may include data corresponding to the wakeword; in other embodiments, the portion of the audio corresponding to the wakeword is removed by the device 110 prior to sending the audio data 411 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. A system 120 may be associated with its own wakeword such that speaking a certain wakeword results in audio data be sent to and processed by a particular system. For example, detection of the wakeword "Alexa" by the wakeword detector 420 may result in sending audio data to system 120*a* for processing while detection of the wakeword "Mandy" by the wakeword detector may result in sending audio data to system 120*b* for processing. The system may have a separate wakeword and system for different skills/systems (e.g., "Dungeon Master" for a game play skill/system 120*c*) and/or such skills/systems may be coordinated by one or more skill(s) 490 of one or more systems 120.

Upon receipt by the system(s) 120, the audio data 411 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 411 to a language processing component 192. The language processing component 192 (sometimes also referred to as a spoken language understanding (SLU) component) includes an automatic speech recognition (ASR) component 450 and a natural language understanding (NLU) component 460. The ASR component 450 may transcribe the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., acoustic units such as phonemes, senons, phones, etc.) and sequences of sounds to identify words that match the sequence of sounds of the speech represented in the audio data 411. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein. The ASR component 450 is described in greater detail below with regard to FIG. 6.

The speech processing system 192 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the device 110, the system(s) 120, a skill component 490, skill processing component(s) 125, etc.) to execute the intent. For example, if the text data corresponds to "play the 5$^{th}$ Symphony by Beethoven," the NLU component 460 may determine an intent that the system output music and may identify "Beethoven" as an artist/composer and "5th Symphony" as the piece of music to be played. For further example, if the text data corresponds to "what is the weather," the NLU component 460 may determine an intent that the system output weather information associated with a geographic location of the device 110. In another example, if the text data corresponds to "turn off the lights," the NLU component 460 may determine an intent that the system turn off lights associated with the device 110 or the user 5.

As noted above, in certain instances a user may issue a request to control a device process. In such a situation, the user may speak the request to one assistant system 120 (for example a second system 120*b*) to control a device process that was actually initiated with a command to another assistant system (for example a first system 120*a*). To correctly process such a request without the second system 120*b* having information about processes related to the first system 120*a*, the NLU 460 may have access to state data 194 that allows a system 120 to determine that the request corresponds to a device control that is capable of being executed by the device 110, through an interface with device skill 191.

The NLU component 460 may return NLU results data 885/825 (which is further discussed below in reference to FIG. 8 and may include tagged text data, indicators of intent, etc.) back to the orchestrator 430. The orchestrator 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data 885/825 includes an N-best list of NLU hypotheses, the NLU component 460 and the orchestrator component 430 may direct the top scoring NLU hypothesis to a skill component(s) 490 associated with the top scoring NLU hypothesis. The system may also include a post-NLU ranker 465 which may incorporate other information to rank potential interpretations determined by the NLU component 460. The local device 110 may also include its own post-NLU ranker, which may operate similarly to the post-NLU ranker 465. The NLU component 460, post-NLU ranker 465 and other components are described in greater detail below with regard to FIGS. 7 and 8.

A skill component may be software running on the system(s) 120 that is akin to a software application. That is, a skill component 490 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 490. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 490 may operate in conjunction between the system(s) 120 and other devices, such as the device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

Skill processing component(s) 125 may communicate with a skill component(s) 490 within the system(s) 120 and/or directly with the orchestrator component 430 or with other components. A skill processing component(s) 125 may be configured to perform one or more actions. An ability to perform such action(s) may sometimes be referred to as a "skill." That is, a skill may enable a skill processing component(s) 125 to execute specific functionality in order to provide data or perform some other action requested by a user. For example, a weather service skill may enable a skill processing component(s) 125 to provide weather information to the system(s) 120, a car service skill may enable a skill processing component(s) 125 to book a trip with respect to a taxi or ride sharing service, an order pizza skill may enable a skill processing component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 490 dedicated to interacting with the skill processing component(s) 125. Unless expressly stated otherwise, reference to a skill, skill device, or skill component may include a skill component 490 operated by the system(s) 120 and/or skill operated by the skill processing component(s) 125. Moreover, the functionality described herein as a skill or skill may be referred to using many different terms, such as an action, bot, app, or the like. The skill 490 and or skill processing component(s) 125 may return output data to the orchestrator 430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems may recognize, retain, and use information collected during more than one input during a back-and-forth or "multi-turn" interaction with the user; for example, information regarding a language in which a dialog is being conducted.

The system(s) 100 may include a dialog manager component 572 that manages and/or tracks a dialog between a user and a device, and in some cases between the user and one or more systems 120. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 572 may associate a dialog session identifier with the dialog upon identifying that the user is engaging in a dialog with the user. The dialog manager component 572 may track a user input and the corresponding system generated response to the user input as a turn. The dialog session identifier may correspond to multiple turns of user input and corresponding system generated response. The dialog manager component 572 may transmit data identified by the dialog session identifier directly to the orchestrator component 430 or other component. Depending on system configuration the dialog manager 572 may determine the appropriate system generated response to give to a particular utterance or user input of a turn. Or creation of the system generated response may be managed by another component of the system (e.g., the language output component 193, NLG 479, orchestrator 430, etc.) while the dialog manager 572 selects the appropriate responses. Alternatively, another component of the system(s) 120 may select responses using techniques discussed herein. The text of a system generated response may be sent to a TTS component 480 for creation of audio data corresponding to the response. The audio data may then be sent to a user device (e.g., device 110) for ultimate output to the user. Alternatively (or in addition) a dialog response may be returned in text or some other form.

The dialog manager 572 may receive the ASR hypothesis/hypotheses (i.e., text data) and make a semantic interpretation of the phrase(s) or statement(s) represented therein. That is, the dialog manager 572 determines one or more meanings associated with the phrase(s) or statement(s) represented in the text data based on words represented in the text data. The dialog manager 572 determines a goal corresponding to an action that a user desires be performed as well as pieces of the text data that allow a device (e.g., the device 110, the system(s) 120, a skill 490, a skill processing component(s) 125, etc.) to execute the intent. If, for example, the text data corresponds to "what is the weather," the dialog manager 572 may determine that that the system(s) 120 is to output weather information associated with a geographic location of the device 110. In another example, if the text data corresponds to "turn off the lights," the dialog manager 572 may determine that the system(s) 120 is to turn off lights associated with the device(s) 110 or the user(s) 5.

The dialog manager 572 may send the results data to one or more skill(s) 490. If the results data includes a single hypothesis, the orchestrator component 430 may send the results data to the skill(s) 490 associated with the hypothesis. If the results data includes an N-best list of hypotheses, the orchestrator component 430 may send the top scoring hypothesis to a skill(s) 490 associated with the top scoring hypothesis.

The system 120 includes a language output component 193. The language output component 193 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data 1010 discussed below). Alternatively or in addition, the TTS component 480 may receive text data from a skill 490 or other system component for output.

The NLG component 479 may include a trained model. The NLG component 479 generates text data 1010 from dialog data received by the dialog manager 572 such that the output text data 1010 has a natural feel and, in some embodiments, includes words and/or phrases specifically formatted for a requesting individual. The NLG may use templates to formulate responses. And/or the NLG system may include models trained from the various templates for forming the output text data 1010. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder. The TTS component 480 may be capable of generating output audio representing natural language speech in one or more natural languages (e.g., English, Mandarin, French, etc.).

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user may give the system 120 permission to allow the skill to execute with respect to the user's natural language user inputs. If a user does not enable a skill, the system 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The profile storage 470 may include data corresponding to state data 194. For example, the profile storage 470 may indicate the device process control capabilities of one or more devices 110 associated with a particular user profile. Such state data 194 may be updated by one or more device(s) 110 as user(s) interact with the device(s) to maintain an updated record of the state of the device. Alternatively (or in addition) the profile storage 470 may include, for a particular user profile, state data 194 reflecting capability data indicating the device process control operations that may be performed by a device 110.

Figure 5:
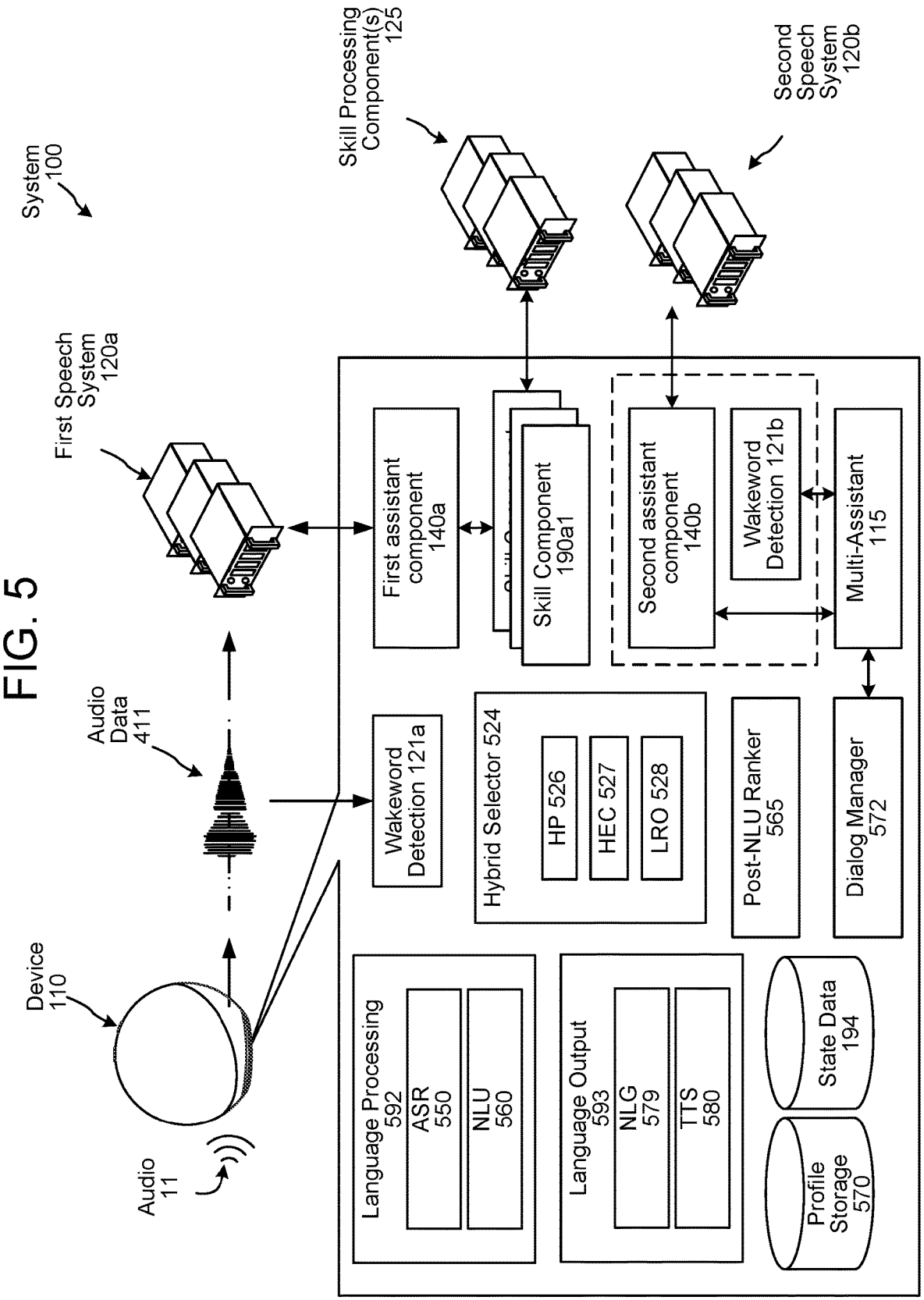
FIG. 5 is a conceptual diagram illustrating components that may be included in a device, according to embodiments of the present disclosure.

Although the components of FIG. 4 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 5 illustrates such a configured device 110.

In the example system 100 shown in FIG. 5, the device 110 includes the first assistant component 140a and the second assistant component 140b. The first assistant component 140a may be in communication with back-end components of the first system 120a (e.g., via the network 199). The first assistant component 140a may also be in communication with the language processing component 592, the language output component 593, a first wakeword detector 121a, and/or hybrid selector 524. The first system 120a may be associated with one or more local skill components 190a1, 190a2, and 190a3 (collectively "skill components 190"). The local skill components 190 may be in communication with one or more skill processing component(s) 125. The second assistant component 140b may be associated with the second system 120b, which may be a separate computing system separate and remote from the device 110. The first system 120a and the second system 120b be configured as described herein; for example, as described with respect to FIG. 1 and FIG. 4.

The second assistant component 140b may be logically or otherwise walled off from certain components of the device 110. For example the second assistant component 140b may not be able to communicate directly with the first assistant component 140a; such communications may need to be mediated by multi-assistant component 115. The second assistant component 140b may include or be associated with its own proprietary components. For example, the second assistant component 140b may be associated with a second wakeword detector 121b. In addition, the second assistant component 140b may leverage separate language processing and language output components, which may reside in the device 110 or the second system 120b. The second assistant component 140b may, however, interface with a multi-assistant component 115 and/or a dialog manager 472, which may be shared between the first assistant component 140a and the second assistant component 140b.

In some implementations, speech processing of input audio data directed to the first system 120a may take place on the device 110. The device 110 may send a message represented in the input audio data to the second system 120b without first sending the input audio data to the first system 120a. For example, the device 110 may receive the input audio data and detect, with the first wakeword detection component 121a, a wakeword corresponding to the first system 120a. The language processing components 592 of the device 110 may process the input audio data and determine that the input audio data represents a request to generate a message and send the message to the second system 120b. The first assistant component 140a may receive the output of the language processing components 592, and forward it to the multi-assistant component 115. The first assistant component 140a may include with the output metadata that indicates that the multi-assistant component 115 is to forward the output to the second system 120b (e.g., via the second assistant component 140b). In some cases, the first assistant component 140a may send the output to the language output components 593 to generate an output in the form of output audio data (e.g., a TTS output) representing the output. The multi-assistant component 593 may receive the output (or output audio data) and metadata, and determine that the output is to be processed by the second system 120b. The multi-assistant component 115 may send the output to the second assistant component 140b. The second assistant component 140b may send the output to the second system 120b. The second system 120b may process the output by, for example, executing a command represented in the output. The system 120b may return response data to the device 110; for example, by sending responsive output audio data to the multi-assistant component 115 for output by a speaker of the device.

In some cases, the multi-assistant component 115 may determine (for example, based on state data regarding an active dialog that includes the input audio data) that the response data from the second system 120b is to be translated back into the language of the input audio data. The multi-assistant component 115 may send the response data to the first system 120a via the first assistant component 140a along with an indication that the response data is to be translated. The response data may, for example, be audio data and/or text data. The first system 120a may return translated response data. The translated response data may be audio data and/or text data, if the translated response data is text data, the multi-assistant component 115 may send it to the language output components 593 for conversion into synthetic speech for output by the device 110.

In at least some embodiments, the system 120 may receive the audio data 411 from the device 110, to recognize speech corresponding to a spoken input in the received audio data 411, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

The device 110 may include one or more wakeword detection components 121 (and/or 121a and/or 121b) configured to compare the audio data 411 to stored models used to detect a wakeword (e.g., "Alexa") that indicates to the device 110 that the audio data 411 is to be processed for determining NLU output data (e.g., slot data that corresponds to a named entity, label data, and/or intent data, etc.). In at least some embodiments, a hybrid selector 524, of the device 110, may send the audio data 411 to the wakeword detection component 121a. If the wakeword detection component 121a detects a wakeword in the audio data 411, the wakeword detection component 121a may send an indication of such detection to the hybrid selector 524. In response to receiving the indication, the hybrid selector 524 may send the audio data 411 to the system 120 and/or the ASR component 550. The wakeword detection component 121a may also send an indication, to the hybrid selector 524, representing a wakeword was not detected. In response to receiving such an indication, the hybrid selector 524 may refrain from sending the audio data 411 to the system 120, and may prevent the ASR component 550 from further processing the audio data 411. In this situation, the audio data 411 can be discarded.

The device 110 may conduct its own speech processing using on-device language processing components, such as an SLU/language processing component 592 (which may include an ASR component 550 and an NLU 560), similar to the manner discussed herein with respect to the SLU component 192 (or ASR component 450 and the NLU component 460) of the system 120. Language processing component 592 may operate similarly to language processing component 192, ASR component 550 may operate similarly to ASR component 450 and NLU component 560 may operate similarly to NLU component 460. The device 110 may also internally include, or otherwise have access to, other components such as one or more skill components 190 capable of executing commands based on NLU output data or other results determined by the device 110/system 120 (which may operate similarly to skill components 490), profile storage 570 (configured to store similar profile data to that discussed herein with respect to the profile storage 470 of the system 120), or other components. In at least some embodiments, the profile storage 570 may only store profile data for a user or group of users specifically associated with the device 110. Similar to as described above with respect to skill component 490, a skill component 190 may communicate with a skill processing component(s) 125. The device 110 may also have its own language output component 593 which may include NLG component 579 and TTS component 580. Language output component 593 may operate similarly to language processing component 192, NLG component 579 may operate similarly to NLG component 479 and TTS component 580 may operate similarly to TTS component 480.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 524, of the device 110, may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 411 to pass to the system 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 411 is received, the HP 526 may allow the audio data 411 to pass through to the system 120 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system 120 or the local language processing components. However, the disclosure is not limited thereto, and in some examples the hybrid selector 524 may send the audio data 411 only to the local ASR component 550 without departing from the disclosure. For example, the device 110 may process the audio data 411 locally without sending the audio data 411 to the system 120.

The local ASR component 550 is configured to receive the audio data 411 from the hybrid selector 524, and to recognize speech in the audio data 411, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 460 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 411 to the system 120, and the response data from the system 120 may include the unique identifier to identify which natural language user input the response data corresponds.

In at least some embodiments, the device 110 may include, or be configured to use, one or more skill components 190 that may work similarly to the skill component(s) 490 implemented by the system 120. The skill component(s) 190 may correspond to one or more domains that are used in order to determine how to act on a spoken input in a particular way, such as by outputting a directive that corresponds to the determined intent, and which can be processed to implement the desired operation. The skill component(s) 190 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill processing component(s) 125. For example, a skill processing component(s) 125 may be located in a remote environment (e.g., separate location) such that the device 110 may only communicate with the skill processing component(s) 125 via the network(s) 199. However, the disclosure is not limited thereto. For example, in at least some embodiments, a skill processing component(s) 125 may be configured in a local environment (e.g., home server and/or the like) such that the device 110 may communicate with the skill processing component(s) 125 via a private network, such as a local area network (LAN).

As used herein, a "skill" may refer to a skill component 190/490, a skill processing component(s) 125, or a combination of a skill component 190/490 and a corresponding skill processing component(s) 125. Similar to the manner discussed herein, the local device 110 may be configured to recognize multiple different wakewords and/or perform different categories of tasks depending on the wakeword. Such different wakewords may invoke different processing components of local device 110 (not illustrated in FIG. 5). For example, detection of the wakeword "Alexa" by the wakeword detector 121*a* may result in sending audio data to certain language processing components 592/skills 190 for processing while detection of the wakeword "Computer" by the wakeword detector may result in sending audio data different language processing components 592/skills 190 for processing.

Figure 6:
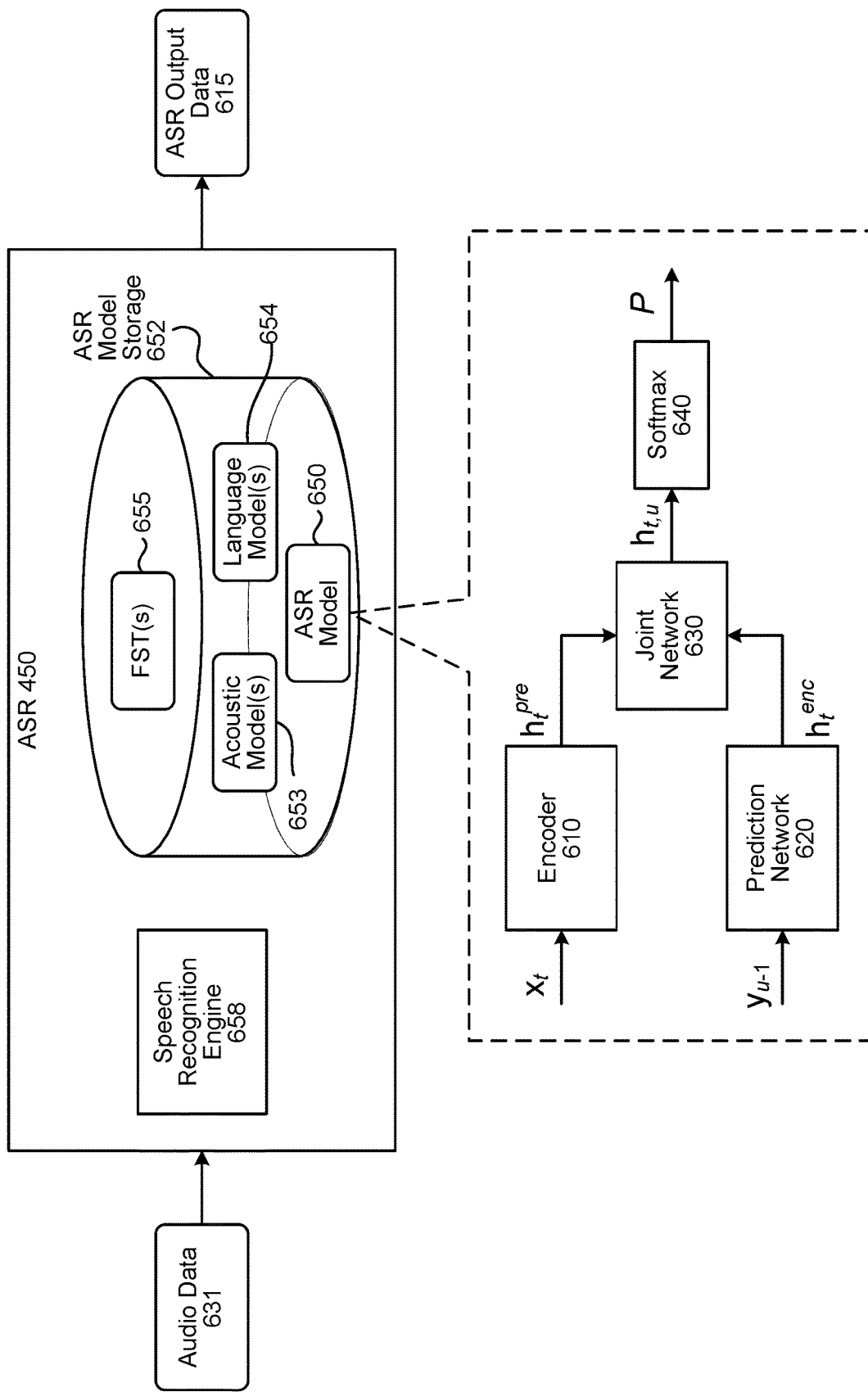
FIG. 6 is a conceptual diagram of an automatic speech processing component, according to embodiments of the present disclosure.

FIG. 6 is a conceptual diagram of an ASR component 450, according to embodiments of the present disclosure. The ASR component 450 may receive audio data 631 and process it to recognize and transcribe speech contained therein. The ASR component 450 may output the transcript as ASR output data 615. In some cases, the ASR component 450 may generate more than one ASR hypothesis (e.g., representing a possible transcript) for a single spoken natural language input. An ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, a similarity of the sound in the spoken natural language input to models for language sounds (e.g., an acoustic model 653 stored in the ASR model storage 652), and the likelihood that a particular word, which matches the sounds, would be included in the sentence at the specific location (e.g., using a language or grammar model 654). Based on the considered factors and the assigned confidence score, the ASR component 450 may output an ASR hypothesis that most likely matches the spoken natural language input, or may output multiple ASR hypotheses in the form of a lattice or an N-best list, with each ASR hypothesis corresponding to a respective score.

The ASR component 450 may interpret a spoken natural language input using one or more models in the ASR model storage 652. Such models may consist of NN-based end-to-end models such as the ASR model 650. Some models may process the audio data 631 based on the similarity between the spoken natural language input and acoustic units (e.g., representing subword units or phonemes) in an acoustic model 653, and use a language models 654 to predict words/phrases/sentences likely represented by sequences of the acoustic units. In some implementations, a finite state transducer (FST) 655 may perform language model functions.

The ASR component 450 may include a speech recognition engine 658. The ASR component 450 may receive audio data 631 from, for example, a microphone 114 of a user device 110. In some cases, the audio data 631 may have been processed audio detected by an acoustic front end (AFE) or other component. The speech recognition engine 658 may process the audio data 631 using one or more of the ASR model 650, acoustic models 653, language models 654, FST(s) 655, and/or other data models and information for recognizing the speech conveyed in the audio data. The audio data 631 may be audio data that has been digitized (for example by the AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. In some embodiments, an audio frame may represent a larger window of audio; for example, ~2 ms. Many different features may be determined, as known in the art, and each feature may represent some quality of the audio that may be useful for ASR processing. A number of approaches may be used by an AFE to process the audio data, such as log-filterbank energies (LFBE), Mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data 631 may arrive at the processing system 120 encoded, in which case they may be decoded by the speech recognition engine 658 and/or prior to processing by the speech recognition engine 658.

In some implementations, the ASR component 450 may process the audio data 631 using the ASR model 650. The ASR model 650 may be, for example, a recurrent neural network such as an RNN-T. The ASR model 650 may predict a probability (y|x) of labels y=($y_1$, ..., $y_u$) given acoustic features x=($x_1$, ..., $x_t$). During inference, the ASR model 650 can generate an N-best list using, for example, a beam search decoding algorithm. The ASR model 650 may include an encoder 610, a prediction network 620, a joint network 630, and a softmax 640. The encoder 610 may be similar or analogous to an acoustic model (e.g., similar to the acoustic model 653 described below), and may process a sequence of acoustic input features to generate encoded hidden representations. The prediction network 620 may be similar or analogous to a language model (e.g., similar to the language model 654 described below), and may process the previous output label predictions, and map them to corresponding hidden representations. The joint network 630 may be, for example, a feed forward NN that may process hidden representations from both the encoder 610 and prediction network 620, and predict output label probabilities. The softmax 640 may be a function implemented (e.g., as a layer of the joint network 630) to normalize the predicted output probabilities.

In some implementations, the speech recognition engine 658 may attempt to match received feature vectors in the audio data 631 to language acoustic units (e.g., phonemes) and words as known in the stored acoustic models 653, language models 654, and/or FST(s) 655. For example, audio data 631 may be processed by one or more acoustic model(s) 653 to determine acoustic unit data. The acoustic unit data may include indicators of acoustic units detected in the audio data 631 by the ASR component 450. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 654 (and/or using FST 655) to determine ASR output data 615. The ASR output data 615 can include one or more hypotheses. One or more of the hypotheses represented in the ASR output data 615 may then be sent to further components (such as the NLU component 660) for further processing as discussed herein. The ASR output data 615 may include representations of text of an utterance, such as words, subword units, or the like.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 450 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senone, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 450 outputs ASR hypotheses that make sense grammatically.

The speech recognition engine 658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 450 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 7:
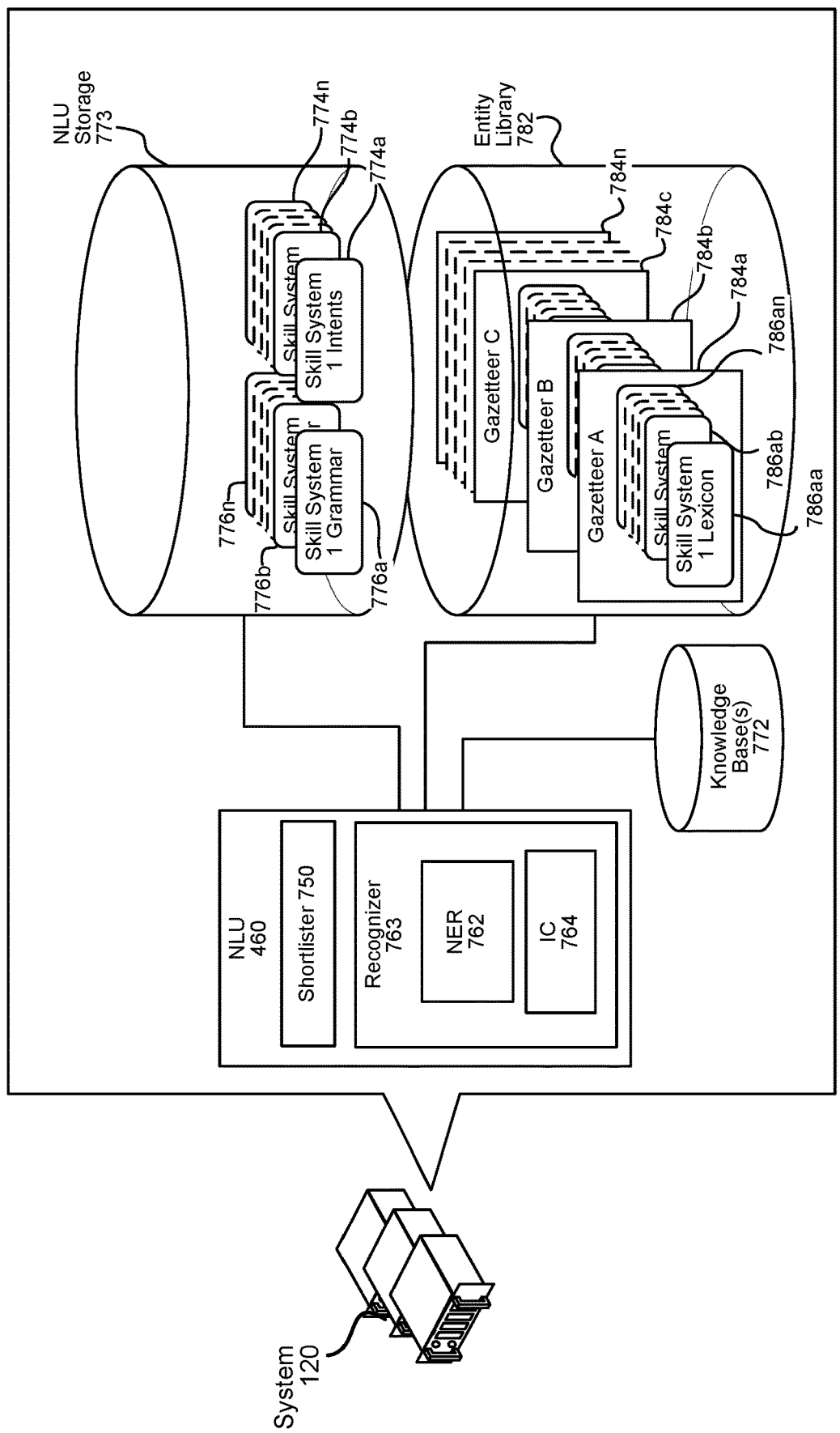
FIG. 7 is a conceptual diagram of how natural language processing is performed, according to embodiments of the present disclosure.
Figure 8:
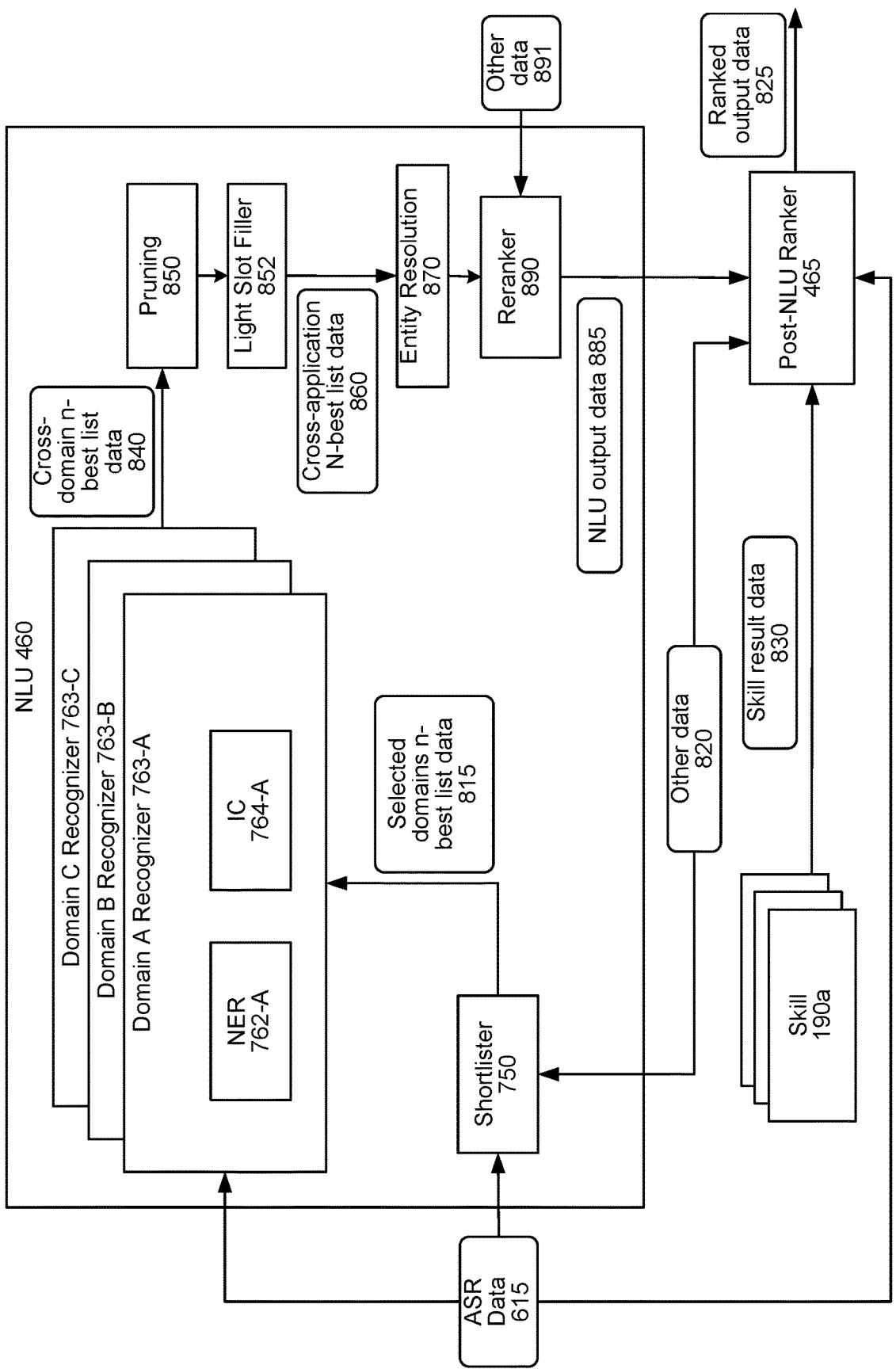
FIG. 8 is a conceptual diagram of how natural language processing is performed, according to embodiments of the present disclosure.

FIGS. 7 and 8 illustrates how the NLU component 460 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure.

FIG. 7 illustrates how NLU processing is performed on text data. The NLU component 460 may process text data including several ASR hypotheses of a single user input. For example, if the ASR component 450 outputs text data including an n-best list of ASR hypotheses, the NLU component 460 may process the text data with respect to all (or a portion of) the ASR hypotheses represented therein.

The NLU component 460 may annotate text data by parsing and/or tagging the text data. For example, for the text data "tell me the weather for Seattle," the NLU component 460 may tag "tell me the weather for Seattle" as an <OutputWeather> intent as well as separately tag "Seattle" as a location for the weather information.

The NLU component 460 may include a shortlister component 750. The shortlister component 750 selects skills that may execute with respect to ASR output data 615 input to the NLU component 460 (e.g., applications that may execute with respect to the user input). The ASR output data 615 (which may also be referred to as ASR data 615) may include representations of text of an utterance, such as words, subword units, or the like. The shortlister component 750 thus limits downstream, more resource intensive NLU processes to being performed with respect to skills that may execute with respect to the user input.

Without a shortlister component 750, the NLU component 460 may process ASR output data 615 input thereto with respect to every skill of the system, either in parallel, in series, or using some combination thereof. By implementing a shortlister component 750, the NLU component 460 may process ASR output data 615 with respect to only the skills that may execute with respect to the user input. This reduces total compute power and latency attributed to NLU processing.

The shortlister component 750 may include one or more trained models. The model(s) may be trained to recognize various forms of user inputs that may be received by the system(s) 120. For example, during a training period skill processing component(s) 125 associated with a skill may provide the system(s) 120 with training text data representing sample user inputs that may be provided by a user to invoke the skill. For example, for a ride sharing skill, a skill processing component(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 750 may be trained, using the training text data representing sample user inputs, to determine other potentially related user input structures that users may try to use to invoke the particular skill. During training, the system(s) 120 may solicit the skill processing component(s) 125 associated with the skill regarding whether the determined other user input structures are permissible, from the perspective of the skill processing component(s) 125, to be used to invoke the skill. The alternate user input structures may be derived by one or more trained models during model training and/or may be based on user input structures provided by different skills. The skill processing component(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 750 may be trained with respect to a different skill. Alternatively, the shortlister component 750 may use one trained model per domain, such as one trained model for skills associated with a weather domain, one trained model for skills associated with a ride sharing domain, etc.

The system(s) 120 may use the sample user inputs provided by a skill processing component(s) 125, and related sample user inputs potentially determined during training, as binary examples to train a model associated with a skill associated with the skill processing component(s) 125. The model associated with the particular skill may then be operated at runtime by the shortlister component 750. For example, some sample user inputs may be positive examples (e.g., user inputs that may be used to invoke the skill). Other sample user inputs may be negative examples (e.g., user inputs that may not be used to invoke the skill).

As described above, the shortlister component 750 may include a different trained model for each skill of the system, a different trained model for each domain, or some other combination of trained model(s). For example, the shortlister component 750 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 750 to output indications of only a portion of the skills that the ASR output data 615 may relate to. For example, a user input may correspond to "tell me about Tom Collins." If the model is clustered based on domain, the shortlister component 750 may determine the user input corresponds to a recipe skill (e.g., a drink recipe) even though the user input may also correspond to an information skill (e.g., including information about a person named Tom Collins).

The NLU component 460 may include one or more recognizers 763. In at least some embodiments, a recognizer 763 may be associated with a skill processing component(s) 125 (e.g., the recognizer may be configured to interpret text data to correspond to the skill processing component(s) 125). In at least some other examples, a recognizer 763 may be associated with a domain such as smart home, video, music, weather, custom, etc. (e.g., the recognizer may be configured to interpret text data to correspond to the domain).

If the shortlister component 750 determines ASR output data 615 is potentially associated with multiple domains, the recognizers 763 associated with the domains may process the ASR output data 615, while recognizers 763 not indicated in the shortlister component 750's output may not process the ASR output data 615. The "shortlisted" recognizers 763 may process the ASR output data 615 in parallel, in series, partially in parallel, etc. For example, if ASR output data 615 potentially relates to both a communications domain and a music domain, a recognizer associated with the communications domain may process the ASR output data 615 in parallel, or partially in parallel, with a recognizer associated with the music domain processing the ASR output data 615.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity associated with a domain, associated with the recognizer 763 implementing the NER component 762. The NER component 762 (or other component of the NLU component 460) may also determine whether a word refers to an entity whose identity is not explicitly mentioned in the text data, for example "him," "her," "it" or other anaphora, exophora, or the like.

Each recognizer 763, and more specifically each NER component 762, may be associated with a particular grammar database 776 and a particular set of intents/actions 774 that may be stored in an NLU storage 773, and a particular personalized lexicon 786 that may be stored in an entity library 782. Each gazetteer 784 may include domain/skill-indexed lexical information associated with a particular user and/or device 110. For example, a Gazetteer A (784*a*) includes skill-indexed lexical information 786*aa* to 786*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 762 applies grammar information 776 and lexical information 786 associated with a domain (associated with the recognizer 763 implementing the NER component 762) to determine a mention of one or more entities in text data. In this manner, the NER component 762 identifies "slots" (each corresponding to one or more particular words in text data) that may be useful for later processing. The NER component 762 may also label each slot with a type (e.g., noun, place, city, artist name, song name, etc.).

Each grammar database 776 includes the names of entities (i.e., nouns) commonly found in speech about the particular domain to which the grammar database 776 relates, whereas the lexical information 786 is personalized to the user and/or the device 110 from which the user input originated. For example, a grammar database 776 associated with a shopping domain may include a database of words commonly used when people discuss shopping.

A downstream process called entity resolution (discussed in detail elsewhere herein) links a slot of text data to a specific entity known to the system. To perform entity resolution, the NLU component 460 may utilize gazetteer information (784*a*-784*n*) stored in an entity library storage 782. The gazetteer information 784 may be used to match text data (representing a portion of the user input) with text data representing known entities, such as song titles, contact names, etc. Gazetteers 784 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 763 may also include an intent classification (IC) component 764. An IC component 764 parses text data to determine an intent(s) (associated with the domain associated with the recognizer 763 implementing the IC component 764) that potentially represents the user input. An intent represents to an action a user desires be performed. An IC component 764 may communicate with a database 774 of words linked to intents. For example, a music intent database may link words and phrases such as "quiet," "volume off," and "mute" to a <Mute> intent. An IC component 764 identifies potential intents by comparing words and phrases in text data (representing at least a portion of the user input) to the words and phrases in an intents database 774 (associated with the domain that is associated with the recognizer 763 implementing the IC component 764).

The intents identifiable by a specific IC component 764 are linked to domain-specific (i.e., the domain associated with the recognizer 763 implementing the IC component 764) grammar frameworks 776 with "slots" to be filled. Each slot of a grammar framework 776 corresponds to a portion of text data that the system believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786 (associated with the domain associated with the recognizer 763 implementing the NER component 762), attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as Hidden Markov Models, maximum entropy models, log linear models, conditional random fields (CRF), and the like. For example, an NER component 762 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb based on a word database associated with the music domain, which an IC component 764 (also implemented by the music domain recognizer) may determine corresponds to a <PlayMusic> intent. At this stage, no determination has been made as to the meaning of "mother's little helper" or "the rolling stones," but based on grammar rules and models, the NER component 762 has determined the text of these phrases relates to the grammatical object (i.e., entity) of the user input represented in the text data.

An NER component 762 may tag text data to attribute meaning thereto. For example, an NER component 762 may tag "play mother's little helper by the rolling stones" as: {domain} Music, {intent}<PlayMusic>, {artist name} rolling stones, {media type} SONG, and {song title} mother's little helper. For further example, the NER component 762 may tag "play songs by the rolling stones" as: {domain} Music, {intent}<PlayMusic>, {artist name} rolling stones, and {media type} SONG.

The shortlister component 750 may receive ASR output data 615 output from the ASR component 450 or output from the device 110b (as illustrated in FIG. 8). The ASR component 450 may embed the ASR output data 615 into a form processable by a trained model(s) using sentence embedding techniques as known in the art. Sentence embedding results in the ASR output data 615 including text in a structure that enables the trained models of the shortlister component 850 to operate on the ASR output data 615. For example, an embedding of the ASR output data 615 may be a vector representation of the ASR output data 615.

The shortlister component 750 may make binary determinations (e.g., yes or no) regarding which domains relate to the ASR output data 615. The shortlister component 750 may make such determinations using the one or more trained models described herein above. If the shortlister component 750 implements a single trained model for each domain, the shortlister component 750 may simply run the models that are associated with enabled domains as indicated in a user profile associated with the device 110 and/or user that originated the user input.

The shortlister component 750 may generate n-best list data 815 representing domains that may execute with respect to the user input represented in the ASR output data 615. The size of the n-best list represented in the n-best list data 815 is configurable. In an example, the n-best list data 815 may indicate every domain of the system as well as contain an indication, for each domain, regarding whether the domain is likely capable to execute the user input represented in the ASR output data 615. In another example, instead of indicating every domain of the system, the n-best list data 815 may only indicate the domains that are likely to be able to execute the user input represented in the ASR output data 615. In yet another example, the shortlister component 750 may implement thresholding such that the n-best list data 815 may indicate no more than a maximum number of domains that may execute the user input represented in the ASR output data 615. In an example, the threshold number of domains that may be represented in the n-best list data 815 is ten. In another example, the domains included in the n-best list data 815 may be limited by a threshold a score, where only domains indicating a likelihood to handle the user input is above a certain score (as determined by processing the ASR output data 615 by the shortlister component 750 relative to such domains) are included in the n-best list data 815.

The ASR output data 615 may correspond to more than one ASR hypothesis. When this occurs, the shortlister component 750 may output a different n-best list (represented in the n-best list data 815) for each ASR hypothesis. Alternatively, the shortlister component 750 may output a single n-best list representing the domains that are related to the multiple ASR hypotheses represented in the ASR output data 615.

As indicated above, the shortlister component 750 may implement thresholding such that an n-best list output therefrom may include no more than a threshold number of entries. If the ASR output data 615 includes more than one ASR hypothesis, the n-best list output by the shortlister component 750 may include no more than a threshold number of entries irrespective of the number of ASR hypotheses output by the ASR component 450. Alternatively or in addition, the n-best list output by the shortlister component 750 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 615, the shortlister component 750 may generate confidence scores representing likelihoods that domains relate to the ASR output data 615. If the shortlister component 750 implements a different trained model for each domain, the shortlister component 750 may generate a different confidence score for each individual domain trained model that is run. If the shortlister component 750 runs the models of every domain when ASR output data 615 is received, the shortlister component 750 may generate a different confidence score for each domain of the system. If the shortlister component 750 runs the models of only the domains that are associated with skills indicated as enabled in a user profile associated with the device 110 and/or user that originated the user input, the shortlister component 750 may only generate a different confidence score for each domain associated with at least one enabled skill. If the shortlister component 750 implements a single trained model with domain specifically trained portions, the shortlister component 750 may generate a different confidence score for each domain who's specifically trained portion is run. The shortlister component 750 may perform matrix vector modification to obtain confidence scores for all domains of the system in a single instance of processing of the ASR output data 615.

N-best list data 815 including confidence scores that may be output by the shortlister component 750 may be represented as, for example:
Search domain, 0.67
Recipe domain, 0.62
Information domain, 0.57
Shopping domain, 0.42

As indicated, the confidence scores output by the shortlister component 750 may be numeric values. The confidence scores output by the shortlister component 750 may alternatively be binned values (e.g., high, medium, low).

The n-best list may only include entries for domains having a confidence score satisfying (e.g., equaling or exceeding) a minimum threshold confidence score. Alternatively, the shortlister component 750 may include entries for all domains associated with user enabled skills, even if one or more of the domains are associated with confidence scores that do not satisfy the minimum threshold confidence score.

The shortlister component 750 may consider other data 820 when determining which domains may relate to the user input represented in the ASR output data 615 as well as respective confidence scores. The other data 820 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 615, for example as determined by a user recognition component.

The other data 820 may be character embedded prior to being input to the shortlister component 750. The other data 820 may alternatively be embedded using other techniques known in the art prior to being input to the shortlister component 750.

The other data 820 may also include data indicating the domains associated with skills that are enabled with respect to the device 110 and/or user that originated the user input. The shortlister component 750 may use such data to determine which domain-specific trained models to run. That is, the shortlister component 750 may determine to only run the trained models associated with domains that are associated with user-enabled skills. The shortlister component 750 may alternatively use such data to alter confidence scores of domains.

As an example, considering two domains, a first domain associated with at least one enabled skill and a second domain not associated with any user-enabled skills of the user that originated the user input, the shortlister component 750 may run a first model specific to the first domain as well as a second model specific to the second domain. Alternatively, the shortlister component 750 may run a model configured to determine a score for each of the first and second domains. The shortlister component 750 may determine a same confidence score for each of the first and second domains in the first instance. The shortlister component 750 may then alter those confidence scores based on which domains is associated with at least one skill enabled by the present user. For example, the shortlister component 750 may increase the confidence score associated with the domain associated with at least one enabled skill while leaving the confidence score associated with the other domain the same. Alternatively, the shortlister component 750 may leave the confidence score associated with the domain associated with at least one enabled skill the same while decreasing the confidence score associated with the other domain. Moreover, the shortlister component 750 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 470. When the shortlister component 750 receives the ASR output data 615, the shortlister component 750 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 750 may use such data to determine which domain-specific trained models to run. For example, if the device 110 corresponds to a displayless type device, the shortlister component 750 may determine not to run trained models specific to domains that output video data. The shortlister component 750 may alternatively use such data to alter confidence scores of domains.

As an example, considering two domains, one that outputs audio data and another that outputs video data, the shortlister component 750 may run a first model specific to the domain that generates audio data as well as a second model specific to the domain that generates video data. Alternatively the shortlister component 750 may run a model configured to determine a score for each domain. The shortlister component 750 may determine a same confidence score for each of the domains in the first instance. The shortlister component 750 may then alter the original confidence scores based on the type of the device 110 that originated the user input corresponding to the ASR output data 615. For example, if the device 110 is a displayless device, the shortlister component 750 may increase the confidence score associated with the domain that generates audio data while leaving the confidence score associated with the domain that generates video data the same. Alternatively, if the device 110 is a displayless device, the shortlister component 750 may leave the confidence score associated with the domain that generates audio data the same while decreasing the confidence score associated with the domain that generates video data. Moreover, if the device 110 is a displayless device, the shortlister component 750 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 750 may decrease the confidence score associated with a domain that generates video data as it may be undesirable to output video content to a user while the user is driving. The device may output data to the system(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 750 may use such data to alter confidence scores of domains. For example, the shortlister component 750 may run a first model specific to a first domain as well as a second model specific to a second domain. Alternatively, the shortlister component 750 may run a model configured to determine a score for each domain. The shortlister component 750 may also determine a same confidence score for each of the domains in the first instance. The shortlister component 750 may then alter the original confidence scores based on the first domain being invoked to cause the system to output content while the current user input was received. Based on the first domain being invoked, the shortlister component 750 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 815 generated by the shortlister component 750 as well as the different types of other data 820 considered by the shortlister component 750 are configurable. For example, the shortlister component 750 may update confidence scores as more other data 820 is considered. For further example, the n-best list data 815 may exclude relevant domains if thresholding is implemented. Thus, for example, the shortlister component 750 may include an indication of a domain in the n-best list 815 unless the shortlister component 750 is one hundred percent confident that the domain may not execute the user input represented in the ASR output data 615 (e.g., the shortlister component 750 determines a confidence score of zero for the domain).

The shortlister component 750 may send the ASR output data 615 to recognizers 763 associated with domains represented in the n-best list data 815. Alternatively, the shortlister component 750 may send the n-best list data 815 or some other indicator of the selected subset of domains to another component (such as the orchestrator component 430) which may in turn send the ASR output data 615 to the recognizers 763 corresponding to the domains included in the n-best list data 815 or otherwise indicated in the indicator. If the shortlister component 750 generates an n-best list representing domains without any associated confidence scores, the shortlister component 750/orchestrator component 430 may send the ASR output data 615 to recognizers 763 associated with domains that the shortlister component 750 determines may execute the user input. If the shortlister component 750 generates an n-best list representing domains with associated confidence scores, the shortlister component 750/orchestrator component 430 may send the ASR output data 615 to recognizers 763 associated with domains associated with confidence scores satisfying (e.g., meeting or exceeding) a threshold minimum confidence score.

A recognizer 763 may output tagged text data generated by an NER component 762 and an IC component 764, as described herein above. The NLU component 460 may compile the output tagged text data of the recognizers 763 into a single cross-domain n-best list 840 and may send the cross-domain n-best list 840 to a pruning component 850. Each entry of tagged text (e.g., each NLU hypothesis) represented in the cross-domain n-best list data 840 may be associated with a respective score indicating a likelihood that the NLU hypothesis corresponds to the domain associated with the recognizer 763 from which the NLU hypothesis was output. For example, the cross-domain n-best list data 840 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 850 may sort the NLU hypotheses represented in the cross-domain n-best list data 840 according to their respective scores. The pruning component 850 may perform score thresholding with respect to the cross-domain NLU hypotheses. For example, the pruning component 850 may select NLU hypotheses associated with scores satisfying (e.g., meeting and/or exceeding) a threshold score. The pruning component 850 may also or alternatively perform number of NLU hypothesis thresholding. For example, the pruning component 850 may select the top scoring NLU hypothesis(es). The pruning component 850 may output a portion of the NLU hypotheses input thereto. The purpose of the pruning component 850 is to create a reduced list of NLU hypotheses so that downstream, more resource intensive, processes may only operate on the NLU hypotheses that most likely represent the user's intent.

The NLU component 460 may include a light slot filler component 852. The light slot filler component 852 can take text from slots represented in the NLU hypotheses output by the pruning component 850 and alter them to make the text more easily processed by downstream components. The light slot filler component 852 may perform low latency operations that do not involve heavy operations such as reference to a knowledge base (e.g., 772. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 772) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity IDs) about the specific entities mentioned in the slots and/or more detailed slot data that can eventually be used by a skill. The NLU component 460 may include multiple entity resolution components 870 and each entity resolution component 870 may be specific to one or more domains.

The NLU component 460 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, user identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 460 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 460 may perform NLU processing described above with respect to domains associated with skills wholly implemented as part of the system(s) 120 (e.g., designated 490 in FIG. 4). The NLU component 460 may separately perform NLU processing described above with respect to domains associated with skills that are at least partially implemented as part of the skill processing component(s) 125. In an example, the shortlister component 750 may only process with respect to these latter domains. Results of these two NLU processing paths may be merged into NLU output data 885, which may be sent to a post-NLU ranker 465, which may be implemented by the system(s) 120.

The post-NLU ranker 465 may include a statistical component that produces a ranked list of intent/skill pairs with associated confidence scores. Each confidence score may indicate an adequacy of the skill's execution of the intent with respect to NLU results data associated with the skill. The post-NLU ranker 465 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 465. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 465 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 465 (or other scheduling component such as orchestrator component 430) may solicit the first skill and the second skill to provide potential result data 830 based on the first NLU hypothesis and the second NLU hypothesis, respectively. For example, the post-NLU ranker 465 may send the first NLU hypothesis to the first skill 490a along with a request for the first skill 490a to at least partially execute with respect to the first NLU hypothesis. The post-NLU ranker 465 may also send the second NLU hypothesis to the second skill 490b along with a request for the second skill 490b to at least partially execute with respect to the second NLU hypothesis. The post-NLU ranker 465 receives, from the first skill 490a, first result data 830a generated from the first skill 490a's execution with respect to the first NLU hypothesis. The post-NLU ranker 465 also receives, from the second skill 490b, second results data 830b generated from the second skill 490b's execution with respect to the second NLU hypothesis.

The result data 830 may include various portions. For example, the result data 830 may include content (e.g., audio data, text data, and/or video data) to be output to a user. The result data 830 may also include a unique identifier used by the system(s) 120 and/or the skill processing component(s) 125 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 465 may consider the first result data 830a and the second result data 830b to alter the first confidence score and the second confidence score of the first NLU hypothesis and the second NLU hypothesis, respectively. That is, the post-NLU ranker 465 may generate a third confidence score based on the first result data 830a and the first confidence score. The third confidence score may correspond to how likely the post-NLU ranker 465 determines the first skill will correctly respond to the user input. The post-NLU ranker 465 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 465 may also consider the other data 820 to generate the third confidence score and the fourth confidence score. While it has been described that the post-NLU ranker 465 may alter the confidence scores associated with first and second NLU hypotheses, one skilled in the art will appreciate that the post-NLU ranker 465 may alter the confidence scores of more than two NLU hypotheses. The post-NLU ranker 465 may select the result data 830 associated with the skill 490 with the highest altered confidence score to be the data output in response to the current user input. The post-NLU ranker 465 may also consider the ASR output data 615 to alter the NLU hypotheses confidence scores.

The orchestrator component 430 may, prior to sending the NLU results data 885 to the post-NLU ranker 465, associate intents in the NLU hypotheses with skills 490. For example, if a NLU hypothesis includes a <PlayMusic> intent, the orchestrator component 430 may associate the NLU hypothesis with one or more skills 490 that can execute the <PlayMusic> intent. Thus, the orchestrator component 430 may send the NLU results data 885, including NLU hypotheses paired with skills 490, to the post-NLU ranker 465. In response to ASR output data 615 corresponding to "what should I do for dinner today," the orchestrator component 430 may generates pairs of skills 490 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 465 queries each skill 490, paired with a NLU hypothesis in the NLU output data 885, to provide result data 830 based on the NLU hypothesis with which it is associated. That is, with respect to each skill, the post-NLU ranker 465 colloquially asks the each skill "if given this NLU hypothesis, what would you do with it." According to the above example, the post-NLU ranker 465 may send skills 490 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 465 may query each of the skills 490 in parallel or substantially in parallel.

A skill 490 may provide the post-NLU ranker 465 with various data and indications in response to the post-NLU ranker 465 soliciting the skill 490 for result data 830. A skill 490 may simply provide the post-NLU ranker 465 with an indication of whether or not the skill can execute with respect to the NLU hypothesis it received. A skill 490 may also or alternatively provide the post-NLU ranker 465 with output data generated based on the NLU hypothesis it received. In some situations, a skill 490 may need further information in addition to what is represented in the received NLU hypothesis to provide output data responsive to the user input. In these situations, the skill 490 may provide the post-NLU ranker 465 with result data 830 indicating slots of a framework that the skill 490 further needs filled or entities that the skill 490 further needs resolved prior to the skill 490 being able to provided result data 830 responsive to the user input. The skill 490 may also provide the post-NLU ranker 465 with an instruction and/or computer-generated speech indicating how the skill 490 recommends the system solicit further information needed by the skill 490. The skill 490 may further provide the post-NLU ranker 465 with an indication of whether the skill 490 will have all needed information after the user provides additional information a single time, or whether the skill 490 will need the user to provide various kinds of additional information prior to the skill 490 having all needed information. According to the above example, skills 490 may provide the post-NLU ranker 465 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 830 includes an indication provided by a skill 490 indicating whether or not the skill 490 can execute with respect to a NLU hypothesis; data generated by a skill 490 based on a NLU hypothesis; as well as an indication provided by a skill 490 indicating the skill 490 needs further information in addition to what is represented in the received NLU hypothesis.

The post-NLU ranker 465 uses the result data 830 provided by the skills 490 to alter the NLU processing confidence scores generated by the reranker 890. That is, the post-NLU ranker 465 uses the result data 830 provided by the queried skills 490 to create larger differences between the NLU processing confidence scores generated by the reranker 890. Without the post-NLU ranker 465, the system may not be confident enough to determine an output in response to a user input, for example when the NLU hypotheses associated with multiple skills are too close for the system to confidently determine a single skill 490 to invoke to respond to the user input. For example, if the system does not implement the post-NLU ranker 465, the system may not be able to determine whether to obtain output data from a general reference information skill or a medical information skill in response to a user input corresponding to "what is acne."

The post-NLU ranker 465 may prefer skills 490 that provide result data 830 responsive to NLU hypotheses over skills 490 that provide result data 830 corresponding to an indication that further information is needed, as well as skills 490 that provide result data 830 indicating they can provide multiple responses to received NLU hypotheses. For example, the post-NLU ranker 465 may generate a first score for a first skill 490a that is greater than the first skill's NLU confidence score based on the first skill 490a providing result data 830a including a response to a NLU hypothesis. For further example, the post-NLU ranker 465 may generate a second score for a second skill 490b that is less than the second skill's NLU confidence score based on the second skill 490b providing result data 830b indicating further information is needed for the second skill 490b to provide a response to a NLU hypothesis. Yet further, for example, the post-NLU ranker 465 may generate a third score for a third skill 490c that is less than the third skill's NLU confidence score based on the third skill 490c providing result data 830c indicating the third skill 490c can provide multiple responses to a NLU hypothesis.

The post-NLU ranker 465 may consider other data 820 in determining scores. The other data 820 may include rankings associated with the queried skills 490. A ranking may be a system ranking or a user-specific ranking. A ranking may indicate a veracity of a skill from the perspective of one or more users of the system. For example, the post-NLU ranker 465 may generate a first score for a first skill 490a that is greater than the first skill's NLU processing confidence score based on the first skill 490a being associated with a high ranking. For further example, the post-NLU ranker 465 may generate a second score for a second skill 490b that is less than the second skill's NLU processing confidence score based on the second skill 490b being associated with a low ranking.

The other data 820 may include information indicating whether or not the user that originated the user input has enabled one or more of the queried skills 490. For example, the post-NLU ranker 465 may generate a first score for a first skill 490a that is greater than the first skill's NLU processing confidence score based on the first skill 490a being enabled by the user that originated the user input. For further example, the post-NLU ranker 465 may generate a second score for a second skill 490b that is less than the second skill's NLU processing confidence score based on the second skill 490b not being enabled by the user that originated the user input. When the post-NLU ranker 465 receives the NLU results data 885, the post-NLU ranker 465 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 465 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 465 may increase the NLU processing confidence score associated with a first skill configured to output visual data and/or decrease the NLU processing confidence score associated with a second skill configured to output audio data.

The other data 820 may include information indicating the veracity of the result data 830 provided by a skill 490. For example, if a user says "tell me a recipe for pasta sauce," a first skill 490a may provide the post-NLU ranker 465 with first result data 830a corresponding to a first recipe associated with a five star rating and a second skill 490b may provide the post-NLU ranker 465 with second result data 830b corresponding to a second recipe associated with a one star rating. In this situation, the post-NLU ranker 465 may increase the NLU processing confidence score associated with the first skill 490a based on the first skill 490a providing the first result data 830a associated with the five star rating and/or decrease the NLU processing confidence score associated with the second skill 490b based on the second skill 490b providing the second result data 830b associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 465 may increase the NLU processing confidence score associated with a first skill 490a corresponding to a room service skill associated with the hotel and/or decrease the NLU processing confidence score associated with a second skill 490*b* corresponding to a food skill not associated with the hotel.

The other data 820 may include information indicating a location of the device and/or user that originated the user input. The system may be configured with skills 490 that may only operate with respect to certain geographic locations. For example, a user may provide a user input corresponding to "when is the next train to Portland." A first skill 490*a* may operate with respect to trains that arrive at, depart from, and pass through Portland, Oregon. A second skill 490*b* may operate with respect to trains that arrive at, depart from, and pass through Portland, Maine. If the device and/or user that originated the user input is located in Seattle, Washington, the post-NLU ranker 465 may increase the NLU processing confidence score associated with the first skill 490*a* and/or decrease the NLU processing confidence score associated with the second skill 490*b*. Likewise, if the device and/or user that originated the user input is located in Boston, Massachusetts, the post-NLU ranker 465 may increase the NLU processing confidence score associated with the second skill 490*b* and/or decrease the NLU processing confidence score associated with the first skill 490*a*.

The other data 820 may include information indicating a time of day. The system may be configured with skills 490 that operate with respect to certain times of day. For example, a user may provide a user input corresponding to "order me food." A first skill 490*a* may generate first result data 830*a* corresponding to breakfast. A second skill 490*b* may generate second result data 830*b* corresponding to dinner. If the system(s) 120 receives the user input in the morning, the post-NLU ranker 465 may increase the NLU processing confidence score associated with the first skill 490*a* and/or decrease the NLU processing score associated with the second skill 490*b*. If the system(s) 120 receives the user input in the afternoon or evening, the post-NLU ranker 465 may increase the NLU processing confidence score associated with the second skill 490*b* and/or decrease the NLU processing confidence score associated with the first skill 490*a*.

The other data 820 may include information indicating user preferences. The system may include multiple skills 490 configured to execute in substantially the same manner. For example, a first skill 490*a* and a second skill 490*b* may both be configured to order food from respective restaurants. The system may store a user preference (e.g., in the profile storage 470) that is associated with the user that provided the user input to the system(s) 120 as well as indicates the user prefers the first skill 490*a* over the second skill 490*b*. Thus, when the user provides a user input that may be executed by both the first skill 490*a* and the second skill 490*b*, the post-NLU ranker 465 may increase the NLU processing confidence score associated with the first skill 490*a* and/or decrease the NLU processing confidence score associated with the second skill 490*b*.

The other data 820 may include information indicating system usage history associated with the user that originated the user input. For example, the system usage history may indicate the user originates user inputs that invoke a first skill 490*a* more often than the user originates user inputs that invoke a second skill 490*b*. Based on this, if the present user input may be executed by both the first skill 490*a* and the second skill 490*b*, the post-NLU ranker 465 may increase the NLU processing confidence score associated with the first skill 490*a* and/or decrease the NLU processing confidence score associated with the second skill 490*b*.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 465 may increase the NLU processing confidence score associated with a first skill 490*a* that generates audio data. The post-NLU ranker 465 may also or alternatively decrease the NLU processing confidence score associated with a second skill 490*b* that generates image data or video data.

The other data 820 may include information indicating how long it took a skill 490 to provide result data 830 to the post-NLU ranker 465. When the post-NLU ranker 465 multiple skills 490 for result data 830, the skills 490 may respond to the queries at different speeds. The post-NLU ranker 465 may implement a latency budget. For example, if the post-NLU ranker 465 determines a skill 490 responds to the post-NLU ranker 465 within a threshold amount of time from receiving a query from the post-NLU ranker 465, the post-NLU ranker 465 may increase the NLU processing confidence score associated with the skill 490. Conversely, if the post-NLU ranker 465 determines a skill 490 does not respond to the post-NLU ranker 465 within a threshold amount of time from receiving a query from the post-NLU ranker 465, the post-NLU ranker 465 may decrease the NLU processing confidence score associated with the skill 490.

It has been described that the post-NLU ranker 465 uses the other data 820 to increase and decrease NLU processing confidence scores associated with various skills 490 that the post-NLU ranker 465 has already requested result data from. Alternatively, the post-NLU ranker 465 may use the other data 820 to determine which skills 490 to request result data from. For example, the post-NLU ranker 465 may use the other data 820 to increase and/or decrease NLU processing confidence scores associated with skills 490 associated with the NLU results data 885 output by the NLU component 460. The post-NLU ranker 465 may select n-number of top scoring altered NLU processing confidence scores. The post-NLU ranker 465 may then request result data 830 from only the skills 490 associated with the selected n-number of NLU processing confidence scores.

As described, the post-NLU ranker 465 may request result data 830 from all skills 490 associated with the NLU results data 885 output by the NLU component 460. Alternatively, the system(s) 120 may prefer result data 830 from skills implemented entirely by the system(s) 120 rather than skills at least partially implemented by the skill processing component(s) 125. Therefore, in the first instance, the post-NLU ranker 465 may request result data 830 from only skills associated with the NLU results data 885 and entirely implemented by the system(s) 120. The post-NLU ranker 465 may only request result data 830 from skills associated with the NLU results data 885, and at least partially implemented by the skill processing component(s) 125, if none of the skills, wholly implemented by the system(s) 120, provide the post-NLU ranker 465 with result data 830 indicating either data response to the NLU results data 885, an indication that the skill can execute the user input, or an indication that further information is needed.

As indicated above, the post-NLU ranker 465 may request result data 830 from multiple skills 490. If one of the skills 490 provides result data 830 indicating a response to a NLU hypothesis and the other skills provide result data 830 indicating either they cannot execute or they need further information, the post-NLU ranker 465 may select the result data 830 including the response to the NLU hypothesis as the data to be output to the user. If more than one of the skills 490 provides result data 830 indicating responses to NLU hypotheses, the post-NLU ranker 465 may consider the other data 820 to generate altered NLU processing confidence scores, and select the result data 830 of the skill associated with the greatest score as the data to be output to the user.

A system that does not implement the post-NLU ranker 465 may select the highest scored NLU hypothesis in the NLU results data 885. The system may send the NLU hypothesis to a skill 490 associated therewith along with a request for output data. In some situations, the skill 490 may not be able to provide the system with output data. This results in the system indicating to the user that the user input could not be processed even though another skill associated with lower ranked NLU hypothesis could have provided output data responsive to the user input.

The post-NLU ranker 465 reduces instances of the aforementioned situation. As described, the post-NLU ranker 465 queries multiple skills associated with the NLU results data 885 to provide result data 830 to the post-NLU ranker 465 prior to the post-NLU ranker 465 ultimately determining the skill 490 to be invoked to respond to the user input. Some of the skills 490 may provide result data 830 indicating responses to NLU hypotheses while other skills 490 may providing result data 830 indicating the skills cannot provide responsive data. Whereas a system not implementing the post-NLU ranker 465 may select one of the skills 490 that could not provide a response, the post-NLU ranker 465 only selects a skill 490 that provides the post-NLU ranker 465 with result data corresponding to a response, indicating further information is needed, or indicating multiple responses can be generated.

The post-NLU ranker 465 may select result data 830, associated with the skill 490 associated with the highest score, for output to the user. Alternatively, the post-NLU ranker 465 may output ranked output data 825 indicating skills 490 and their respective post-NLU ranker rankings. Since the post-NLU ranker 465 receives result data 830, potentially corresponding to a response to the user input, from the skills 490 prior to post-NLU ranker 465 selecting one of the skills or outputting the ranked output data 825, little to no latency occurs from the time skills provide result data 830 and the time the system outputs responds to the user.

If the post-NLU ranker 465 selects result audio data to be output to a user and the system determines content should be output audibly, the post-NLU ranker 465 (or another component of the system(s) 120) may cause the device 110*a* and/or the device 110*b* to output audio corresponding to the result audio data. If the post-NLU ranker 465 selects result text data to output to a user and the system determines content should be output visually, the post-NLU ranker 465 (or another component of the system(s) 120) may cause the device 110*b* to display text corresponding to the result text data. If the post-NLU ranker 465 selects result audio data to output to a user and the system determines content should be output visually, the post-NLU ranker 465 (or another component of the system(s) 120) may send the result audio data to the ASR component 450. The ASR component 450 may generate output text data corresponding to the result audio data. The system(s) 120 may then cause the device 110*b* to display text corresponding to the output text data. If the post-NLU ranker 465 selects result text data to output to a user and the system determines content should be output audibly, the post-NLU ranker 465 (or another component of the system(s) 120) may send the result text data to the TTS component 480. The TTS component 480 may generate output audio data (corresponding to computer-generated speech) based on the result text data. The system(s) 120 may then cause the device 110*a* and/or the device 110*b* to output audio corresponding to the output audio data.

As described, a skill 490 may provide result data 830 either indicating a response to the user input, indicating more information is needed for the skill 490 to provide a response to the user input, or indicating the skill 490 cannot provide a response to the user input. If the skill 490 associated with the highest post-NLU ranker score provides the post-NLU ranker 465 with result data 830 indicating a response to the user input, the post-NLU ranker 465 (or another component of the system(s) 120, such as the orchestrator component 430) may simply cause content corresponding to the result data 830 to be output to the user. For example, the post-NLU ranker 465 may send the result data 830 to the orchestrator component 430. The orchestrator component 430 may cause the result data 830 to be sent to the device (110*a*/110*b*), which may output audio and/or display text corresponding to the result data 830. The orchestrator component 430 may send the result data 830 to the ASR component 450 to generate output text data and/or may send the result data 830 to the TTS component 480 to generate output audio data, depending on the situation.

The skill 490 associated with the highest post-NLU ranker score may provide the post-NLU ranker 465 with result data 830 indicating more information is needed as well as instruction data. The instruction data may indicate how the skill 490 recommends the system obtain the needed information. For example, the instruction data may correspond to text data or audio data (i.e., computer-generated speech) corresponding to "please indicate_____." The instruction data may be in a format (e.g., text data or audio data) capable of being output by the device (110*a*/110*b*). When this occurs, the post-NLU ranker 465 may simply cause the received instruction data be output by the device (110*a*/110*b*). Alternatively, the instruction data may be in a format that is not capable of being output by the device (110*a*/110*b*). When this occurs, the post-NLU ranker 465 may cause the ASR component 450 or the TTS component 480 to process the instruction data, depending on the situation, to generate instruction data that may be output by the device (110*a*/110*b*). Once the user provides the system with all further information needed by the skill 490, the skill 490 may provide the system with result data 830 indicating a response to the user input, which may be output by the system as detailed above.

The system may include "informational" skills 490 that simply provide the system with information, which the system outputs to the user. The system may also include "transactional" skills 490 that require a system instruction to execute the user input. Transactional skills 490 include ride sharing skills, flight booking skills, etc. A transactional skill 490 may simply provide the post-NLU ranker 465 with result data 830 indicating the transactional skill 490 can execute the user input. The post-NLU ranker 465 may then cause the system to solicit the user for an indication that the system is permitted to cause the transactional skill 490 to execute the user input. The user-provided indication may be an audible indication or a tactile indication (e.g., activation of a virtual button or input of text via a virtual keyboard). In response to receiving the user-provided indication, the system may provide the transactional skill 490 with data corresponding to the indication. In response, the transactional skill 490 may execute the command (e.g., book a flight, book a train ticket, etc.). Thus, while the system may not further engage an informational skill 490 after the informational skill 490 provides the post-NLU ranker 465 with result data 830, the system may further engage a transactional skill 490 after the transactional skill 490 provides the post-NLU ranker 465 with result data 830 indicating the transactional skill 490 may execute the user input.

In some instances, the post-NLU ranker 465 may generate respective scores for first and second skills that are too close (e.g., are not different by at least a threshold difference) for the post-NLU ranker 465 to make a confident determination regarding which skill should execute the user input. When this occurs, the system may request the user indicate which skill the user prefers to execute the user input. The system may output TTS-generated speech to the user to solicit which skill the user wants to execute the user input.

The other data 820 and/or other data 891 may include state data 195 that represents a state of particular operations relative to a specific speech-processing system 120. For example, a first system 120a may have access to first system state data 195a that indicates what interactions a particular user profile/device 110 have had with the first system 120a while a second system 120b may have access to second system state data 195b that indicates what interactions a particular user profile/device 110 have had with the second system 120b. As can be appreciated, first system state data 195a will be different from second system state data 195b and the first system 120a will likely not have access to second system state data 195b while the second system 120b will likely not have access to first system state data 195a. (And so on for other systems and their respective state data 195.) The respective system's state data 195 as part of other data 820 and/or other data 891 allows a specific system 120 to interpret and/or rank an incoming request in a manner consistent with previous interactions with that particular system 120, as such interactions may be represented in the state data 195.

Speech processing, such as that described above, may be based on the device/profile state data 194. Specifically, the other data 820 and/or other data 891 may also include state data 194 that represents what device process controls may be executed by a requesting device 110 and/or a device associated with a user profile of a requesting device (for example as indicated by state data 194m). As discussed above, certain state data 194 related to a device 110 and/or user profile may be made available to an assistant system 120. Such state data 194 (e.g., 194a, 194b, etc.) may have some overlap with state data 194m that is available to a device component, for example a multi-assistant component 115. The state data made available to a first assistant system 120a may not include information related to a second assistant system 120b. For example, state data 194b available to a second system 120b may not include information identifying operations performed by a first system 120a. This may be due to privacy perception concerns, security concerns, system configurations, etc. However, allowing access to certain limited state data 194 enables the system 100 to allow control of device processes by multiple assistant system(s) 120, even those that may not have initiated a particular device process.

As noted above, a device process may involve controlling a process that involves some action to be performed by the device 110. Such a device process control may include, for example, starting/stopping a timer, setting/stopping an alarm, playing/stopping media content (such as a song, video, podcast, etc.), controlling output content (such as skipping a song, going back a song, extending/snoozing a timer/alarm, stopping synthesized speech output, etc.), setting a temperature (for example if a device may operate as a thermostat), activating/deactivating a component of the device (such as a camera, light, etc.), controlling a device setting (such as volume, brightness, sensitivity, etc.), setting/controlling a reminder, initiating/controlling/terminating a call or call request, or the like. A device process control may thus control a device to transition from a first state (e.g., outputting audio, showing something on a display) to a second state (e.g., ceasing output of audio, outputting audio at a different volume, showing something else on the display, removing something from the display, etc.).

The state data 194 (e.g., 194m) included in the other data 820 and/or other data 891 may thus indicate what such device process controls may be executed by a device 110 and/or other device(s) associated with the particular user profile. To determine this state data 194, a system 120 may receive the state data 194 from a device, for example from a multi-assistant component 115 as illustrated above in reference to FIGS. 2A and 2B. In another example, a system 120 may receive an indicator of the device 110/user profile of an incoming request and may obtain the appropriate state data 194 from another source using the indicator. For example, the system 120 may communicate with a storage component corresponding to the device/user profile to obtain the relevant state data 194.

The reranker 890 and/or post-NLU ranker 465 may use the device/profile state data 194 to interpret the ASR data 615/select a particular NLU hypothesis that interprets the incoming utterance as one that is requesting control of a device process. For example, a user may speak a command such as "Alexa, stop." Without access to the device/profile state data 194, an NLU component 460b of a second system 120b may determine a potential NLU hypothesis of "stop music" but if the state data 195b does not indicate active music playback relative to both the second system 120b and the particular requesting device 110, the interpretation of "stop music" may receive a low ranking (for example by a reranker 890b and/or post-NLU ranker 465b) because the second system 120b is unaware of any active music playback. If, however, the second system 120b has access to the device/profile state data 194, and the device/profile state data 194 indicates that the device 110 (or another device of the requesting profile) is capable of performing a stop music command, the reranker 890 and/or post-NLU ranker 465 may give the interpretation of "stop music" a higher ranking. Thus, in a situation where a "play music" command was previously spoken to an assistant/system other than second system 120b, the second system 120b may still be able to properly interpret a command such as "Alexa, stop" as a command to control a device process controllable by device 110 (as indicated by the device/profile state data 194) even if the second system 120b has no information about the specific active music playback, what music is playing, how it was initiated, etc.

In the above example, with the use of device/profile state data 194, the NLU 460b and/or post-NLU ranker 465b may properly interpret "Alexa, stop" as a command to control a device process. Thus the selected hypothesis may correspond to NLU results data 825/885 that indicates a <stop-music> command and also indicates the destination for such a command should be a device skill 191b. The NLU results data 825/885, along with an indicator linked to the requesting device 110/user profile, may be output by the NLU 460b and/or post-NLU ranker 465b. The indicator may be an indicator of the requesting device 110, the requesting user profile, the specific utterance, or other indicator that may be used by another component (for example Orchestrator 230) to link the NLU results data 825/885 to the original request/utterance.

The NLU 460 may also use the device/profile state data 194 to properly determine which device the input request corresponds to. For example, an incoming request such as "Alexa, stop" may be captured by one device, such as a smart watch 110*c* (shown in FIG. 12). The speech-processing system 120 may receive an indication of the user profile corresponding to the smart watch 110*c* along with device/profile state data 194 for the smart watch 110*c* and/or other device(s) 110 associated with the particular user profile. The device/profile state data 194 may indicate that a music playback device (e.g., speech-detection device 110*a*, vehicle 110*e*, home audio system, etc.) is capable of executing a <stopmusic> command while the smart watch 110*c* itself may not be capable of executing such a command. The NLU 460 and/or post-NLU ranker 465 may use the device/profile state data 194 to interpret the incoming request/rank hypotheses thereof to determine that the "Alexa, stop" request corresponds to a target device that is different from the smart watch 110*c* that captured the input utterance. The resulting NLU results data 825/885 may thus indicate that target device so that the device skill 191 may send the output data to the appropriate device (e.g., speech-detection device 110*a*, vehicle 110*e*, home audio system, etc.) to execute the stop music command.

The NLU results data 825/885 may be sent (for example by the Orchestrator 230 and/or another component) to the device skill 191*b*. Alternatively, or in addition, the Orchestrator 230 and/or another component may process the NLU results data 825/885 to determine other data representing the requested device process control (e.g., <stopmusic>) where the other data is in a different form processable by the device skill 191*b*. The device skill 191*b* may then take the input data representing the user's request (where the input data may be the NLU results data 825/885 or data in some other form) and may determine output data that is operable by a device component (e.g., multi-assistant component 115) to cause execution of the device process control and may send that output data to the particular device 110, for example as explained above in reference to FIGS. 2A and 2B.

To reduce the amount of information shared between speech-processing system(s) 120, the state data 194 made available to speech-processing system(s) 120 may be configured to relate only to certain possible device control process(es) of a particular device. In one embodiment, the device/profile state data 194 made available to speech-processing system(s) 120 may only include controls executable by a device that relate to an active device process. For example, if a device 110 is outputting music, the state data 194 relative to that device 110 made available to a speech-processing system 120 may include information related to particular controls of the music process executable by that the particular device 110 (e.g., stop music, volume control, pause playback, etc.) but may not include information related to controls executable by the particular device 110, but not related to the active music playback (for example, stopping an alarm, extending a timer, etc.). In a different example, if a device 110 is outputting a beep related to an expired timer, the state data 194 relative to that device 110 made available to a speech-processing system 120 may include information related to particular controls of the timer process executable by that the particular device 110 (e.g., stop timer, extend timer, etc.) but not any information related to other, non-active, device processes. A determination of what device process(es) are active may be made by a component of the respective device 110, for example by the multi-assistant component 115 or other component. The multi-assistant component 115 may then select a portion of the state data 194 related to those active process(es) and send that selected portion to a speech-processing system 120 (for example, as shown in FIGS. 2A and 2B).

In certain instances, the state data 194 may include priority data corresponding to one or more device process(es). For example, if a device has multiple controllable process(es), some of which may be active at a particular time, the state data 194 may indicate a relative priority of those processes. A speech-processing system 120 may process the priority data to determine the interpretation of an input request (e.g., using NLU 460) and/or the ranking of different NLU hypotheses(es) of that interpretation (e.g., using reranker 890 and/or post-NLU ranker 465). Example priority data may take the form of:
1. Active process A
2. Active process B
3. Inactive process C
4. Inactive process D Thus, if a device 110 is capable of controlling four processes (A-D in the example above), two of which are active (A and B), if a user speaks a command to the device "Alexa stop" and the speech-processing system 120 determines (for example using state data 194) that a command of "stop" may apply to either process A or process B, an NLU hypotheses corresponding to process A may be ranked higher than an NLU hypotheses corresponding to process B as a result of the priority data. In a specific example, process A may correspond to a beeping timer and process B may correspond to music playback. Thus, if a user speaks "Alexa stop" to a device 110 without indicating what should be stopped, the system may prioritize stopping the timer and cause the timer, instead of the music playback, to be stopped.

Priority may also be impacted based on system state data 195. Thus, for example, if the first system state data 195*a* of a first system 120*a* indicates that there is an ongoing process related to the first system 120*a* that can be controlled with a "stop" command, and the user invokes the first system 120*a* (for example by speaking the wakeword "Alexa" where "Alexa" invokes first system 120*a*), then the process known to the first system 120*a* may be prioritized. Taking the specific example above, if the process known to the first system 120*a* is actually the music playback, even if the device/profile state data 194 indicates a higher priority for a timer control, if the first system 120*a* is performing the speech processing, its available information in the first system state data 195*a* may cause an NLU hypotheses corresponding to the music playback to be ranked higher than an NLU hypotheses corresponding to time control. Such prioritization may be configured in a variety of ways depending on the configuration of system 100.

In certain configurations, priority data corresponding to one or more device control processes may impact a score given to a particular NLU hypothesis by the reranker 890 and/or post-NLU ranker 465. For example, priority data may be in a form of:
1. Active process A [0.85]
2. Active process B [0.75]
3. Inactive process C [0.55]
4. Inactive process D [0.45]

The modifiers (e.g., [0.85] for process A, [0.75] for process B, etc.) may be used to adjust a score of a hypothesis corresponding to the particular process to create a resulting score to be used by the reranker 890 and/or post-NLU ranker 465. In this manner the priority data may be used to determine the score and/or ranking of a hypothesis corresponding to one or more device process(es).

The device/profile state data 194 may also indicate a type of a device process controllable by a device 110. For example, one type may be a dialog, another type may be a notification, another type may be a timer, another type may be media output (e.g., audio or video), another type may involve a call (e.g., video or audio communication), or the like. The type may also correspond to a component of the device used for the process such as a speaker, display, etc. The device/profile state data 194 may also indicate what components of a device 110 may be active at any particular time, which may be used by a speech-processing system 120 to interpret an utterance. For example, if the user says "Alexa, quiet!" the speech-processing system 120 may use the device/profile state data 194 to prioritize control over a device process that involves audio output.

Figure 9:
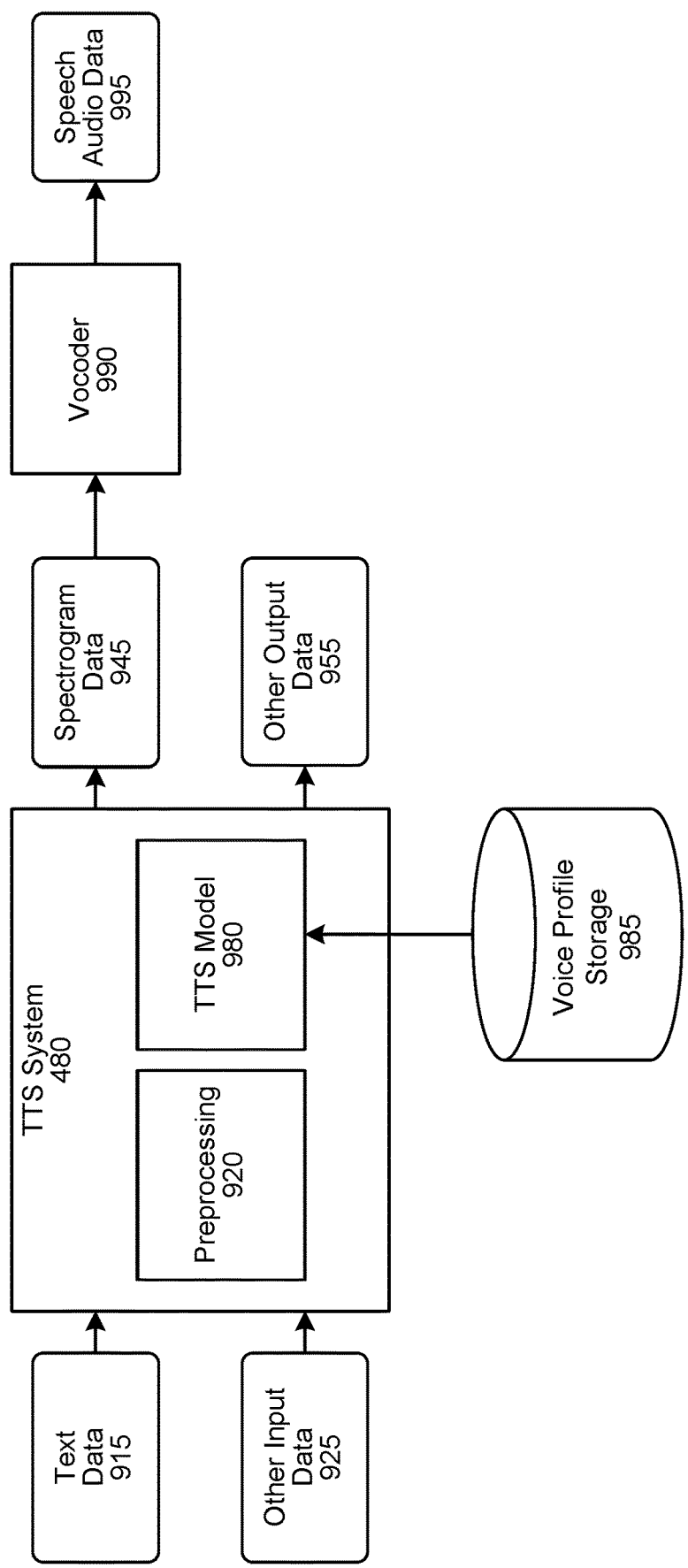
FIG. 9 is a conceptual diagram of text-to-speech components according to embodiments of the present disclosure.

Components of a system that may be used to perform unit selection, parametric TTS processing, and/or model-based audio synthesis are shown in FIG. 9. FIG. 9 is a conceptual diagram that illustrates operations for generating synthesized speech using a TTS system 480, according to embodiments of the present disclosure. The TTS system 480 may receive text data 915 and process it using one or more TTS models 980 to generate synthesized speech in the form of spectrogram data 945. A vocoder 990 may convert the spectrogram data 945 into output speech audio data 995, which may represent a time-domain waveform suitable for amplification and output as audio (e.g., from a loudspeaker).

The TTS system 480 may additionally receive other input data 925. The other input data 925 may include, for example, identifiers and/or labels corresponding to a desired speaker identity, voice characteristics, emotion, speech style, etc. desired for the synthesized speech. In some implementations, the other input data 925 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 915 and/or the other input data 925 such as metadata accompanying a TTS request and indicating what text should be whispered (or have some other indicated audio characteristic).

The TTS system 480 may include a preprocessing component 920 that can convert the text data 915 and/or other input data 925 into a form suitable for processing by the TTS model 980. The text data 915 may be from, for example an application, a skill component (described further below), an NLG component, another device or source, or may be input by a user. The text data 915 received by the TTS system 480 may not necessarily be text, but may include other data (such as symbols, code, other data, etc.) that may reference text (such as an indicator of a word and/or phoneme) that is to be synthesized. The preprocessing component 920 may transform the text data 915 into, for example, a symbolic linguistic representation, which may include linguistic context features such as phoneme data, punctuation data, syllable-level features, word-level features, and/or emotion, speaker, accent, or other features for processing by the TTS system 480. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 915, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 920 may include functionality and/or components for performing text normalization, linguistic analysis, linguistic prosody generation, or other such operations. During text normalization, the preprocessing component 920 may first process the text data 915 and generate standard text, converting such things as numbers, abbreviations (such as Apt., St., etc.), symbols ($, %, etc.) into the equivalent of written out words.

During linguistic analysis, the preprocessing component 920 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 980 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 920 may also identify different grammatical components such as prefixes, suffixes, phrases, punctuation, syntactic boundaries, or the like. Such grammatical components may be used by the TTS system 480 to craft a natural-sounding audio waveform output. The language dictionary may also include letter-to-sound rules and other tools that may be used to pronounce previously unidentified words or letter combinations that may be encountered by the TTS system 480. Generally, the more information included in the language dictionary, the higher quality the speech output.

The output of the preprocessing component 920 may be a symbolic linguistic representation, which may include a sequence of phonetic units. In some implementations, the sequence of phonetic units may be annotated with prosodic characteristics. In some implementations, prosody may be applied in part or wholly by a TTS model 980. This symbolic linguistic representation may be sent to the TTS model 980 for conversion into audio data (e.g., in the form of Mel-spectrograms or other frequency content data format).

The TTS system 480 may retrieve one or more previously trained and/or configured TTS models 980 from the voice profile storage 985. A TTS model 980 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 980 may be stored in the voice profile storage 985. A TTS model 980 may represent a particular speaker identity and may be conditioned based on speaking style, emotion, etc. In some implementations, a particular speaker identity may be associated with more than one TTS model 980; for example, with a different model representing a different speaking style, language, emotion, etc. in some implementations, a particular TTS model 980 may be associated with more than one speaker identity; that is, be able to produce synthesized speech that reproduces voice characteristics of more than one character. Thus a first TTS model 980*a* may be used to create synthesized speech for the first-speech processing system 120*a* while a second, different, TTS model 980*b* may be used to create synthesized speech for the second-speech processing system 120*b*. In some cases, the TTS model 980 may generate the desired voice characteristics based on conditioning data received or determined from the text data 915 and/or the other input data 925. For example a synthesized voice of the first-speech processing system 120*a* may be different from a synthesized voice of the second-speech processing system 120*b*.

The TTS system 480 may, based on an indication received with the text data 915 and/or other input data 925, retrieve a TTS model 980 from the voice profile storage 985 and use it to process input to generate synthesized speech. The TTS system 480 may provide the TTS model 980 with any relevant conditioning labels to generate synthesized speech having the desired voice characteristics. The TTS model 980 may generate spectrogram data 945 (e.g., frequency content data) representing the synthesized speech, and send it to the vocoder 990 for conversion into an audio signal.

The TTS system 480 may generate other output data 955. The other output data 955 may include, for example, indications or instructions for handling and/or outputting the synthesized speech. For example, the text data 915 and/or other input data 925 may be received along with metadata, such as SSML tags, indicating that a selected portion of the text data 915 should be louder or quieter. Thus, the other output data 955 may include a volume tag that instructs the vocoder 990 to increase or decrease an amplitude of the output speech audio data 995 at times corresponding to the selected portion of the text data 915. Additionally or alternatively, a volume tag may instruct a playback device to raise or lower a volume of the synthesized speech from the device's current volume level, or lower a volume of other media being output by the device (e.g., to deliver an urgent message).

The vocoder 990 may convert the spectrogram data 945 generated by the TTS model 980 into an audio signal (e.g., an analog or digital time-domain waveform) suitable for amplification and output as audio. The vocoder 990 may be, for example, a universal neural vocoder based on Parallel WaveNet or related model. The vocoder 990 may take as input audio data in the form of, for example, a Mel-spectrogram with 80 coefficients and frequencies ranging from 50 Hz to 12 kHz. The speech audio data 995 may be a time-domain audio format (e.g., pulse-code modulation (PCM), waveform audio format (WAV), μ-law, etc.) that may be readily converted to an analog signal for amplification and output by a loudspeaker, such as the loudspeaker 112. The speech audio data 995 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
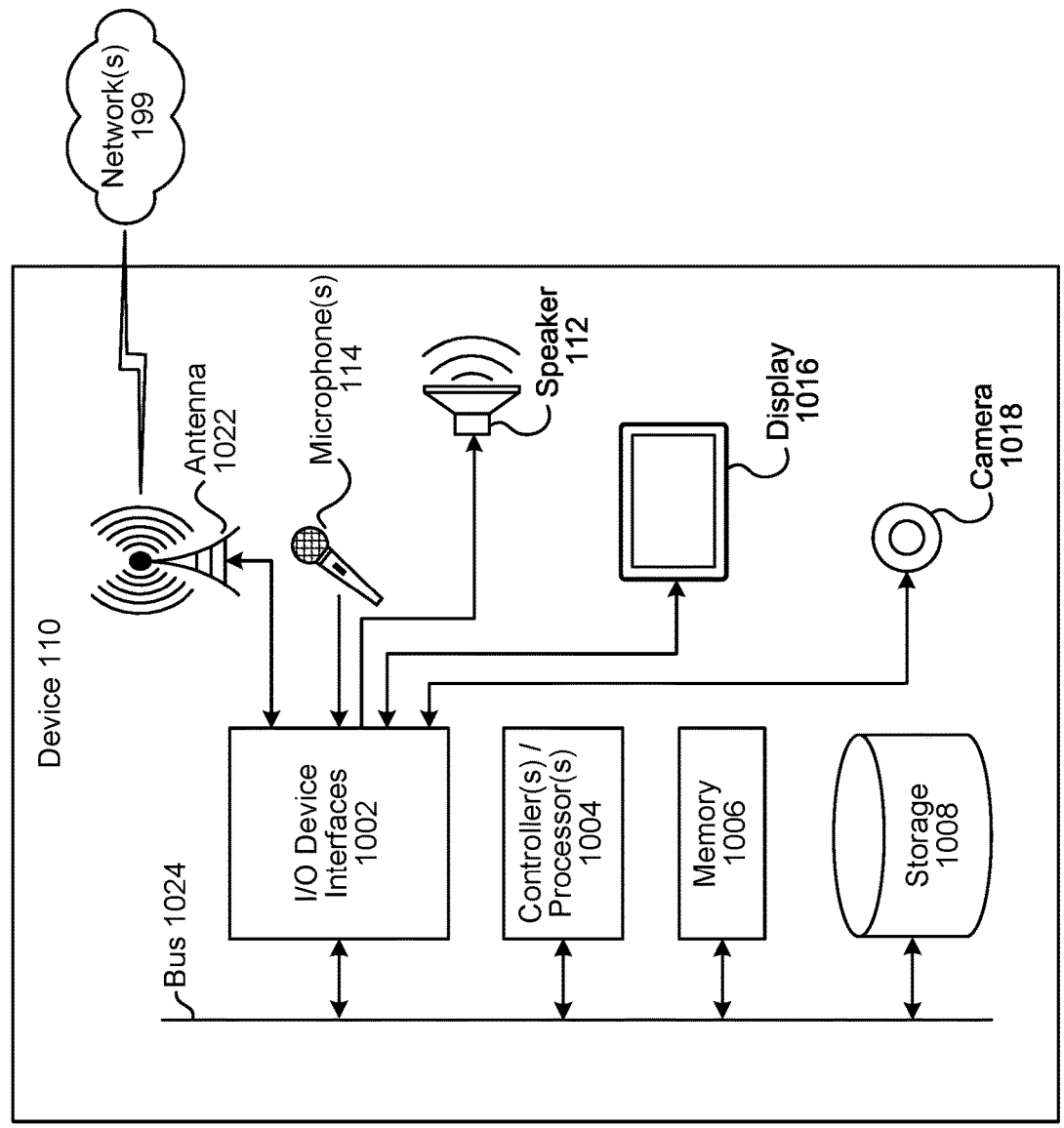
FIG. 10 is a block diagram conceptually illustrating example components of a device, according to embodiments of the present disclosure.

FIG. 10 is a block diagram conceptually illustrating a device 110 that may be used with the system. FIG. 11 is a block diagram conceptually illustrating example components of a remote device, such as the natural language command processing system 120, which may assist with ASR processing, NLU processing, etc., and a skill processing component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The processing system 120 may also be a version of a user device 110 that includes different (e.g., more) processing capabilities than other user device(s) 110 in a home/office. One benefit to the server/system 120 being in a user's home/business is that data used to process a command/return a response may be kept within the user's home, thus reducing potential privacy perception concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 112, a wired headset or a wireless headset (not illustrated), or other component capable of outputting audio. The device 110 may also include an audio capture component. The audio capture component may be, for example, a microphone 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system 120, or a skill processing component(s) 125 may include their own dedicated processors, memory, and/or storage. Alternatively, one or more of the components of the device(s) 110, the natural language command processing system 120, or a skill processing component(s) 125 may utilize the I/O interfaces (1002/1102), processor(s) (1004/1104), memory (1006/1106), and/or storage (1008/1108) of the device(s) 110, natural language command processing system 120, or the skill processing component(s) 125, respectively. Thus, the ASR component XXA50 may have its own I/O interface(s), processor(s), memory, and/or storage; the NLU component XXA60 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill processing component(s) 125, as described herein, are illustrative, and may be located as a stand-alone device or may be included, in whole or in part, as a component of a larger device or system. As can be appreciated, a number of components may exist either on a system 120 and/or on device 110. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 12, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, headphones 110b/110n, etc. may be connected to the network(s) 199 through a wireless service provider, over a Wi-Fi or cellular network connection, or the like. Other devices are included as network-connected support devices, such as the natural language command processing system 120, the skill processing component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

capturing a first utterance by a first device configured to operate with a plurality of speech-processing systems including a first speech-processing system and a second speech-processing system;

processing first audio data representing the first utterance to determine the first utterance includes a first wakeword invoking the first speech-processing system;

sending, from a first component of the first device to the first speech-processing system, the first audio data, the first component configured to operate with regard to the first speech-processing system;

receiving, by the first component from the first speech-processing system, first output data responsive to the first audio data;

sending the first output data from the first component to a second component of the first device, the second component configured to operate with regard to the plurality of speech-processing systems;

processing, by the second component, the first output data to determine a first command to terminate a process involving the first device;

processing, by the second component, state data corresponding to the first device to determine that the process was initiated in response to a command invoking the second speech-processing system;

sending, from the second component to a third component of the first device, an indication to terminate the process, the third component configured to operate with regard to the second speech-processing system; and in response to the indication, terminating the process.

2. The computer-implemented method of claim 1, further comprising, prior to capturing the first utterance:
  capturing a second utterance by the first device;
  processing second audio data representing the second utterance to determine the second utterance includes a second wakeword invoking the second speech-processing system;
  sending, from the third component to the second speech-processing system, the second audio data;
  receiving, from the second speech-processing system, second output data indicating a second command to start the process;
  starting the process using the first device; and
  by the second component, determining the state data, wherein the state data indicates the process was initiated in response to a command invoking the second speech-processing system.

3. The computer-implemented method of claim 2, further comprising:
  prior to receiving the first output data, sending the state data from the second component to the first speech-processing system.

4. The computer-implemented method of claim 1, further comprising:
  determining, by the second component, that the process is active; and
  after discontinuing the process, sending, from the third component to the second speech-processing system, a second indication that the process was discontinued by the first device.

5. A computer-implemented method comprising:
  capturing a first utterance by a first device configured to operate with a plurality of speech-processing systems including a first speech-processing system and a second speech-processing system;
  determining the first utterance corresponds to an invocation of the first speech-processing system;
  sending, from the first device to the first speech-processing system, first audio data representing the first utterance;
  sending, from a component of the first device to the first speech-processing system, first state data representing an active first device process of the first device, the component configured to operate with regard to the plurality of speech-processing systems;
  receiving, by the component of the first device, a first command to control the first device process using the first device;
  in response to the first command, executing a first operation to control the first device process; and
  configuring updated state data corresponding to the first device, the updated state data reflecting execution of the first operation.

6. The computer-implemented method of claim 5, further comprising, prior to capturing the first utterance:
  capturing a second utterance by the first device;
  determining the second utterance corresponds to an invocation of the second speech-processing system;
  sending, from the first device to the second speech-processing system, second audio data representing the second utterance;
  receiving, by the component of the first device, a second command to initiate the first device process using the first device; and
  in response to the second command, executing a second operation to initiate the first device process.

7. The computer-implemented method of claim 6, further comprising, after receiving the first command:
  sending, from the first device to the second speech-processing system, an indication corresponding to control of the first device process.

8. The computer-implemented method of claim 6, further comprising:
  prior to receiving the second command:
    determining a first user corresponding to the second utterance,
    determining the first user corresponds to a first profile, and
    sending an indication of the first profile to the second speech-processing system; and
  after receiving the second command and prior to receiving the first command:
    determining a second user corresponding to the first utterance,
    determining the second user corresponds to the first profile, and
    sending an indication of the first profile to the first speech-processing system.

9. The computer-implemented method of claim 6, wherein:
  sending the second audio data to the second speech-processing system uses a second component of the first device corresponding to the second speech-processing system; and
  sending the first audio data to the first speech-processing system uses a third component of the first device corresponding to the first speech-processing system.

10. The computer-implemented method of claim 5, further comprising:
  sending, from the first device to the first speech-processing system, second data corresponding to at least one active hardware component of the first device.

11. The computer-implemented method of claim 5, wherein the first state data further corresponds to a second device process controllable by the first device and the first state data indicates the first device process is active and the second device process is inactive.

12. The computer-implemented method of claim 11, further comprising:
  determining, by the component, first priority data corresponding to the first device process;
  determining, by the component, second priority data corresponding to the second device process; and
  prior to receiving the first command, sending, to the first speech-processing system, the first priority data and the second priority data.

13. A device, comprising:
  at least one microphone;
  a first component configured to operate with regard to a plurality of speech-processing systems including a first speech-processing system and a second speech-processing system;
  at least one processor; and
  at least one memory comprising instructions that, when executed by the at least one processor, cause the device to:
    capture a first utterance using the at least one microphone;
    determine the first utterance corresponds to an invocation of the first speech-processing system;
    send, to the first speech-processing system, first audio data representing the first utterance;

send, from the first component to the first speech-processing system, first state data representing an active first device process;

receive, by the first component, a first command to control the first device process;

in response to the first command, execute a first operation to control the first device process; and configure updated state data, the updated state data reflecting execution of the first operation.

14. The device of claim 13, wherein the at least one memory further includes instructions that, when executed by the at least one processor, further cause the device to, prior to capturing the first utterance:

capture a second utterance;

determine the second utterance corresponds to an invocation of the second speech-processing system;

send, to the second speech-processing system, second audio data representing the second utterance;

receive, by the first component, a second command to initiate the first device process; and in response to the second command, execute a second operation to initiate the first device process.

15. The device of claim 14, wherein the at least one memory further includes instructions that, when executed by the at least one processor, further cause the device to, after receiving the first command:

send, to the second speech-processing system, an indication corresponding to control of the first device process.

16. The device of claim 14, wherein the at least one memory further includes instructions that, when executed by the at least one processor, further cause the device to:

prior to receiving the second command:

determine a first user corresponding to the second utterance, determine the first user corresponds to a first profile, and send an indication of the first profile to the second speech-processing system; and after receiving the second command and prior to receiving the first command:

determine a second user corresponding to the first utterance, determine the second user corresponds to the first profile, and send an indication of the first profile to the first speech-processing system.

17. The device of claim 14, wherein:

sending of the second audio data to the second speech-processing system uses a second component of the device corresponding to the second speech-processing system; and sending of the first audio data to the first speech-processing system uses a third component of the device corresponding to the first speech-processing system.

18. The device of claim 13, wherein the at least one memory further includes instructions that, when executed by the at least one processor, further cause the device to:

send, to the first speech-processing system, second data corresponding to at least one active hardware component of the device.

19. The device of claim 13, wherein the first state data further corresponds to a second device process controllable by the device and the first state data indicates the first device process is active and the second device process is inactive.

20. The device of claim 19, wherein the at least one memory further includes instructions that, when executed by the at least one processor, further cause the device to:

determine, by the first component, first priority data corresponding to the first device process;

determine, by the first component, second priority data corresponding to the second device process; and prior to receiving the first command, send, to the first speech-processing system, the first priority data and the second priority data.

* * * * *